(12) United States Patent
Hu et al.

(10) Patent No.: US 12,242,866 B2
(45) Date of Patent: Mar. 4, 2025

(54) ENERGY-EFFICIENT DISPLAY PROCESSING METHOD AND DEVICE

(71) Applicant: Huawei Technologies Co., Ltd., Shenzhen (CN)

(72) Inventors: Zhengyuan Hu, Xi'an (CN); Bing Li, Shenzhen (CN); Wen Liu, Xi'an (CN); Shuqiang Gong, Dongguan (CN); Zichen Xie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 17/780,866

(22) PCT Filed: Nov. 17, 2020

(86) PCT No.: PCT/CN2020/129327
§ 371 (c)(1),
(2) Date: May 27, 2022

(87) PCT Pub. No.: WO2021/104104
PCT Pub. Date: Jun. 3, 2021

(65) Prior Publication Data
US 2023/0004406 A1 Jan. 5, 2023

(30) Foreign Application Priority Data

Nov. 28, 2019 (CN) .......................... 201911194739.X
Dec. 6, 2019 (CN) .......................... 201911245165.4

(51) Int. Cl.
*G06F 9/451* (2018.01)
*G06F 1/32* (2019.01)
(Continued)

(52) U.S. Cl.
CPC ............ *G06F 9/451* (2018.02); *G06F 1/3265* (2013.01); *G06F 1/3293* (2013.01); *G06F 9/542* (2013.01)

(58) Field of Classification Search
CPC ........ G06F 9/451; G06F 9/942; G06F 9/5044; G06F 1/3265; G06F 1/3293; G06F 9/542; G06T 15/005
See application file for complete search history.

(56) References Cited

U.S. PATENT DOCUMENTS 8,893,013 B1 * 11/2014 Groves ................. G06F 3/1454
715/740
2008/0030509 A1 2/2008 Conroy et al.
(Continued)

FOREIGN PATENT DOCUMENTS

CN 200959110 Y 10/2007
CN 101118645 A 2/2008
(Continued)

OTHER PUBLICATIONS

Zhou Shuhong, Analysis of hot patented technologies in the field of electricity, Intellectual Property Press, 2017, only the Abstract and with its English translation, 8 pages.

*Primary Examiner* — Ting Z Lee
(74) *Attorney, Agent, or Firm* — Conley Rose, P.C.

(57) ABSTRACT

An electronic device includes a first graphics processing subsystem, a second graphics processing subsystem, and a screen. The first graphics processing subsystem includes a first application processor, a first graphics processing unit, and a first memory. The second graphics processing subsystem includes a second application processor, a second graphics processing unit, and a second memory. The first graphics processing unit renders a first GUI. The screen displays the first GUI. The second graphics processing unit renders a second GUI, and the second GUI and the first GUI belong (Continued)

to different interface types. The screen displays the second GUI. A display processing method applied to the electronic device is also provided, wherein the first graphics processing subsystem can be switched to the second graphics processing subsystem based on complexity of a to-be-displayed GUI.

15 Claims, 15 Drawing Sheets

(51) Int. Cl.
*G06F 1/3234* (2019.01)
*G06F 1/3293* (2019.01)
*G06F 9/54* (2006.01)

(56) References Cited

U.S. PATENT DOCUMENTS

| | | | |
|---|---|---|---|
| 2008/0030510 A1* | 2/2008 | Wan | G06T 1/20 |
| | | | 345/505 |
| 2008/0034238 A1 | 2/2008 | Hendry et al. | |
| 2008/0182630 A1* | 7/2008 | Parks | G06F 1/3293 |
| | | | 455/574 |
| 2009/0079746 A1 | 3/2009 | Howard et al. | |
| 2009/0153540 A1 | 6/2009 | Blinzer et al. | |
| 2009/0160853 A1* | 6/2009 | Takezaki | G06T 15/005 |
| | | | 345/419 |
| 2010/0220102 A1 | 9/2010 | Wyatt et al. | |
| 2010/0253690 A1 | 10/2010 | Rose | |
| 2010/0328323 A1 | 12/2010 | Redman et al. | |
| 2011/0261062 A1* | 10/2011 | Kawata | G06F 1/3265 |
| | | | 345/503 |
| 2012/0050259 A1* | 3/2012 | Solomonov | G06T 15/005 |
| | | | 345/419 |
| 2013/0038615 A1* | 2/2013 | Hendry | G06T 1/20 |
| | | | 345/502 |
| 2015/0067672 A1* | 3/2015 | Mitra | G06F 9/5077 |
| | | | 718/1 |
| 2015/0149798 A1 | 5/2015 | Enomoto | |
| 2015/0193906 A1* | 7/2015 | Zheng | G09G 5/363 |
| | | | 345/522 |
| 2016/0180804 A1 | 6/2016 | Suzuki | |
| 2017/0018275 A1 | 1/2017 | Gunn et al. | |
| 2019/0206023 A1* | 7/2019 | Dimitrov | G06T 15/005 |
| 2019/0235615 A1* | 8/2019 | Shows | G06F 1/3206 |

FOREIGN PATENT DOCUMENTS

| | | | | |
|---|---|---|---|---|
| CN | 101501624 A | 8/2009 | | |
| CN | 101751114 A | 6/2010 | | |
| CN | 101819512 A | 9/2010 | | |
| CN | 102789306 A | 11/2012 | | |
| CN | 104765594 A | 7/2015 | | |
| CN | 106296564 A | 1/2017 | | |
| EP | 2428948 A1 | 3/2012 | | |
| JP | 2010517166 A | 5/2010 | | |
| JP | 2010540988 A | 12/2010 | | |
| JP | 2011509446 A | 3/2011 | | |
| JP | 2013186727 A | 9/2013 | | |
| JP | 2013257717 A | 12/2013 | | |
| JP | 2018508801 A | 3/2018 | | |
| WO | 2009038902 A1 | 3/2009 | | |
| WO | WO-2019040221 A1 * | 2/2019 | | A63F 13/50 |

* cited by examiner

ENERGY-EFFICIENT DISPLAY PROCESSING METHOD AND DEVICE

CROSS-REFERENCE TO RELATED APPLICATIONS

This is a National Stage Application of International Patent Application No. PCT/CN2020/129327 filed on Nov. 17, 2020, which claims priority to Chinese Patent Application No. 201911194739.X filed on Nov. 28, 2019, and Chinese Patent Application No. 201911245165.4 filed on Dec. 6, 2019. All of the aforementioned applications are hereby incorporated by reference in their entireties.

TECHNICAL FIELD

Embodiments of this application relate to the field of electronic technologies, and in particular, to an energy-efficient display processing method and a device.

BACKGROUND

With the development of electronic technologies, more types and functions of electronic devices such as wearable devices and mobile phones emerge. The electronic device may display various graphical user interfaces (graphical user interface, GUI) for a user via a screen, to help the user browse information or perform interface interaction with the electronic device.

In a process of using the electronic device by the user, the electronic device may need to display a complex GUI, for example, a game interface or a three-dimensional (3 dimensions, 3D) watch face. To meet a drawing requirement of the complex GUI, the electronic device needs to be provided with a high-performance graphics processing unit (graphics processing unit, GPU) for graphics display processing. However, power consumption of the high-performance GPU is relatively high. Consequently, power consumption of the electronic device is relatively high, and energy efficiency is relatively low.

SUMMARY

Embodiments of this application provide an energy-efficient display processing method and a device, so that graphics processing subsystems with different performance and power consumption can be switched to based on complexity of different to-be-displayed GUIs, to perform GUI display processing. This can reduce overall power consumption of an electronic device and improve energy efficiency of the electronic device.

To achieve the foregoing objective, the following technical solutions are used in embodiments of this application.

According to one aspect, an embodiment of this application provides a display processing method, and the method may be applied to an electronic device. The electronic device includes a first graphics processing subsystem, a second graphics processing subsystem, and a screen. The first graphics processing subsystem includes a first graphics processing unit, a first application processor, and a first memory used in cooperation with the first application processor and the first graphics processing unit. The second graphics processing subsystem includes a second graphics processing unit, a second application processor, and a second memory used in cooperation with the second application processor and the second graphics processing unit. The method includes: The first graphics processing subsystem renders a first graphical user interface GUI. Then, the screen displays the rendered first GUI. The first application processor sends a switching notification to the second application processor after the first application processor determines that a preset condition is met. After receiving the switching notification, the second application processor notifies the second graphics processing unit to render a to-be-displayed second GUI, where the second GUI and the first GUI correspond to different interface types. The second graphics processing unit renders the second GUI. Then, the screen displays the rendered second GUI.

In this way, for to-be-displayed GUIs of different interface types, the electronic device can switch to use graphics processing subsystems with different performance and different power consumption for display processing, instead of using a unified graphics processing subsystem with high performance and high power consumption for processing. The to-be-displayed GUIs of the different interface types have different complexity. Therefore, the electronic device may balance display processing performance and power consumption of different to-be-displayed GUIs, to implement optimal energy efficiency for the different to-be-displayed GUIs. The plurality of graphics processing subsystems in the electronic device have relatively low average power consumption and relatively high average energy efficiency. In addition, the plurality of graphics processing subsystems have relatively high overall energy efficiency and relatively low overall power consumption. Therefore, energy efficiency of the electronic device for graphics display processing is relatively high, and overall power consumption of the electronic device is relatively low.

In a possible design, that the first application processor sends a switching notification to the second application processor after the first application processor determines that a preset condition is met includes: The first application processor sends the switching notification to the second application processor after the first application processor determines that a first input operation is detected and the preset condition is met.

That is, the electronic device determines, only after detecting triggering of an input operation of a user, whether to perform graphics processing subsystem switching.

In another possible design, the electronic device further includes a memory, and the memory stores a preset application corresponding to the second graphics processing subsystem. That the first application processor determines that a preset condition is met includes: The first application processor determines that the second GUI corresponds to a first interface type and the first GUI corresponds to a second interface type. A GUI of the first interface type includes a GUI corresponding to the preset application, and a GUI of the second interface type includes a GUI other than the GUI corresponding to the preset application.

In this solution, the electronic device may prestore the preset application corresponding to the second graphics processing subsystem. If the to-be-displayed second GUI corresponds to the preset application, the electronic device may perform display processing by using the second graphics processing subsystem.

For example, the preset application includes a payment application, a camera application, a music application, a call application, or a game application; the preset application has a function associated with remote network communication; or the preset application is a third-party application.

In another possible design, the electronic device further includes a memory, and the memory stores a preset function corresponding to the second graphics processing subsystem.

That the first application processor determines that a preset condition is met includes: The first application processor determines that the second GUI corresponds to a first interface type and the first GUI corresponds to a second interface type. A GUI of the first interface type includes a GUI corresponding to the preset function, and a GUI of the second interface type includes a GUI other than the GUI corresponding to the preset function.

In this solution, the electronic device may prestore the preset function corresponding to the second graphics processing subsystem. If the to-be-displayed second GUI corresponds to the preset function, the electronic device may perform display processing by using the second graphics processing subsystem.

For example, the preset function may be associated with remote network communication.

In a possible design, the electronic device further includes a memory, and the memory stores a preset GUI corresponding to the second graphics processing subsystem. That the first application processor determines that a preset condition is met includes: The first application processor determines that the second GUI corresponds to a first interface type and the first GUI corresponds to a second interface type. A GUI of the first interface type includes a preset GUI, and a GUI of the second interface type includes a GUI other than the preset GUI.

In this solution, the electronic device may prestore the preset GUI corresponding to the second graphics processing subsystem. If the to-be-displayed second GUI matches the preset GUI, the electronic device may perform display processing by using the second graphics processing subsystem.

In a possible design, the second GUI and the first GUI are respectively of a 3D interface type and a 2D interface type.

In other words, the electronic device may separately render a GUI of the 3D interface type and a GUI of the 2D interface type by using different graphics processing subsystems. For example, the GUI of the 3D interface type may be a 3D watch face interface, and the GUI of the 2D interface type may be a 2D watch face interface.

In a possible design, the electronic device further includes a memory, the memory stores at least one preset parameter group corresponding to the second graphics processing subsystem, and the preset parameter group includes a preset GUI and a preset input operation. That the first application processor determines that a preset condition is met includes: The first application processor determines that a second input operation is detected. The first GUI and the second input operation match the preset GUI and the preset input operation in the preset parameter group.

In this solution, the electronic device may adaptively switch, in real time based on a currently displayed interface and a to-be-displayed GUI corresponding to an input operation, to use a corresponding graphics processing subsystem, so that complexity of the to-be-displayed GUI can match, in real time, performance and power consumption of the graphics processing subsystem that is switched to. This can reduce overall power consumption of the graphics processing subsystem and the electronic device, and improve energy efficiency of the graphics processing subsystem and the electronic device.

In another possible design, that the first application processor determines that a preset condition is met includes: The first application processor determines that a third input operation is detected. The third input operation is used to indicate to perform graphics processing subsystem switching, or the third input operation is used to indicate to use the second graphics processing subsystem.

In this solution, the electronic device may determine, based on an input operation of a user, a target graphics processing subsystem or whether to perform graphics processing subsystem switching.

In another possible design, after the first application processor determines that the preset condition is met, and before the screen displays the rendered second GUI, the method further includes: The first graphics processing subsystem renders a transition interface, and the screen displays the rendered transition interface.

In this way, the transition interface may continuously provide interface display for the user in a graphics processing subsystem switching process, to avoid a phenomenon such as interruption, a black screen, or screen flickering on an interface viewed by the user, and improve visual experience of the user.

In another possible design, the first graphics processing subsystem further includes a first communications bus configured to connect internal components of the first graphics processing subsystem. The second graphics processing subsystem further includes a second communications bus configured to connect internal components of the second graphics processing subsystem.

In other words, different graphics processing subsystems may include different communications buses. For example, the communications buses have different dominant frequencies and communication rates. In this way, the different graphics processing subsystems have different performance, power consumption, and energy efficiency.

In another possible design, the first input operation, the second input operation, and the third input operation include a touchscreen-based input operation, a button-based operation, or a voice input operation.

That is, the user may interact with the electronic device by using a touchscreen, a button, or voice.

In another possible design, the electronic device is a wearable device.

According to another aspect, an embodiment of this application provides an electronic device, including a first graphics processing subsystem, a second graphics processing subsystem, and a screen. The first graphics processing subsystem includes a first graphics processing unit, a first application processor, and a first memory used in cooperation with the first application processor and the first graphics processing unit. The second graphics processing subsystem includes a second graphics processing unit, a second application processor, and a second memory used in cooperation with the second application processor and the second graphics processing unit. The first graphics processing subsystem is configured to render a first graphical user interface GUI. The screen is configured to display the rendered first GUI. The first application processor is configured to send a switching notification to the second application processor after the first application processor determines that a preset condition is met. The second application processor is configured to: after receiving the switching notification from the first application processor, notify the second graphics processing unit to render a to-be-displayed second GUI. The second GUI and the first GUI correspond to different interface types. The second graphics processing unit is configured to render the second GUI. The screen is further configured to display the rendered second GUI.

In a possible design, that the first application processor is configured to send a switching notification to the second application processor after the first application processor determines that a preset condition is met specifically includes: The first application processor is configured to send the switching notification to the second application processor after the first application processor determines that a first input operation is detected and the preset condition is met.

In another possible design, the electronic device further includes a memory. The memory is configured to store a preset application corresponding to the second graphics processing subsystem. That the first application processor is configured to determine that a preset condition is met specifically includes: The first application processor is configured to determine that the second GUI corresponds to a first interface type and the first GUI corresponds to a second interface type. A GUI of the first interface type includes a GUI corresponding to the preset application, and a GUI of the second interface type includes a GUI other than the GUI corresponding to the preset application.

In another possible design, the preset application includes a payment application, a camera application, a music application, a call application, or a game application; the preset application has a function associated with remote network communication; or the preset application is a third-party application.

In another possible design, the electronic device further includes a memory. The memory is configured to store a preset function corresponding to the second graphics processing subsystem. That the first application processor is configured to determine that a preset condition is met specifically includes: The first application processor is configured to determine that the second GUI corresponds to a first interface type and the first GUI corresponds to a second interface type. A GUI of the first interface type includes a GUI corresponding to the preset function, and a GUI of the second interface type includes a GUI other than the GUI corresponding to the preset function.

In another possible design, the electronic device further includes a memory. The memory is configured to store a preset GUI corresponding to the second graphics processing subsystem. That the first application processor is configured to determine that a preset condition is met specifically includes: The first application processor is configured to determine that the second GUI corresponds to a first interface type and the first GUI corresponds to a second interface type. A GUI of the first interface type includes a preset GUI, and a GUI of the second interface type includes a GUI other than the preset GUI.

In another possible design, the electronic device further includes a memory. The memory is configured to store at least one preset parameter group corresponding to the second graphics processing subsystem, and the preset parameter group includes a preset GUI and a preset input operation. That the first application processor is configured to determine that a preset condition is met specifically includes: The first application processor is configured to determine that a second input operation is detected. The first GUI and the second input operation match the preset GUI and the preset input operation in the preset parameter group.

In another possible design, that the first application processor is configured to determine that a preset condition is met specifically includes: The first application processor is configured to determine that a third input operation is detected. The third input operation is used to indicate to perform graphics processing subsystem switching, or the third input operation is used to indicate to use the second graphics processing subsystem.

In another possible design, the first graphics processing unit is further configured to render a transition interface after the first application processor determines that the preset condition is met and before the screen displays the rendered second GUI. The screen is further configured to display the rendered transition interface.

In another possible design, the second graphics processing subsystem is further configured to: receive a display request signal periodically sent by the screen; and after the second GUI is rendered, send image data corresponding to the rendered second GUI to the screen within a receiving interval between two display request signals. That the screen is configured to display the rendered second GUI specifically includes: The screen is configured to display the rendered second GUI based on the image data.

In another possible design, the first graphics processing subsystem further includes a first communications bus configured to connect internal components of the first graphics processing subsystem, and the second graphics processing subsystem further includes a second communications bus configured to connect internal components of the second graphics processing subsystem.

In another possible design, the electronic device is a wearable device.

According to another aspect, an embodiment of this application provides a display processing apparatus. The apparatus is included in an electronic device. The apparatus has a function of implementing behavior of the electronic device in any method according to the foregoing aspects and the possible designs. The function may be implemented by hardware, or may be implemented by hardware by executing corresponding software. The hardware or the software includes at least one module or unit corresponding to the function, for example, a rendering module/unit, a display module/unit, or a processing module/unit.

According to still another aspect, an embodiment of this application provides an electronic device, including one or more processors and a memory. The memory stores code. When the code is executed by the electronic device, the electronic device is enabled to perform the display processing method performed by the electronic device in any possible design of the foregoing aspects.

According to another aspect, an embodiment of this application provides a computer-readable storage medium, including computer instructions. When the computer instructions are run on an electronic device, the electronic device is enabled to perform the display processing method according to any possible design of the foregoing aspects.

According to still another aspect, an embodiment of this application provides a computer program product. When the computer program product is run on a computer, the computer is enabled to perform the display processing method performed by the electronic device in any possible design of the foregoing aspects.

According to another aspect, an embodiment of this application provides a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the display processing method in any possible design of the foregoing aspects.

For beneficial effects corresponding to the foregoing other aspects, refer to the descriptions of the beneficial effects in the method aspects. Details are not described herein again.

DESCRIPTION OF EMBODIMENTS

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example. A and/or B may represent the following three cases: Only A exists, both A and B exist, and only B exists. In addition, in the descriptions in embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

An electronic device such as a wearable device or a mobile phone may display a GUI for a user, to help the user browse information or perform interface interaction with the electronic device. The GUI displayed by the electronic device may be a complex GUI such as a game interface, or may be a simple GUI such as a home screen. In other words, the electronic device does not always display a complex GUI, and does not always display a simple GUI.

Figure 1A:
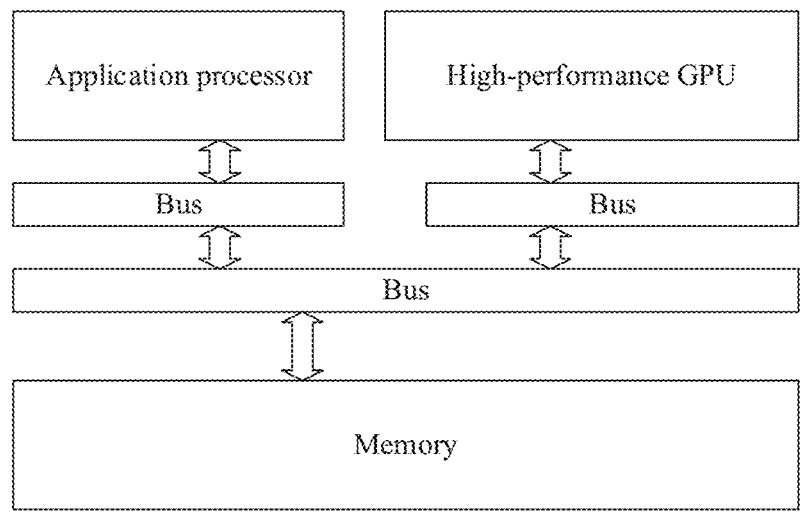
FIG. 1A to FIG. 1C are schematic diagrams of architectures of a group of graphics processing systems according to the conventional technology.

To display a complex GUI, the electronic device has a graphics display processing capability of the complex GUI. For example, refer to FIG. 1A. The electronic device has a high-performance GPU for displaying a complex GUI. In some conventional technologies, the electronic device uniformly uses the high-performance GPU to perform graphics display processing on a complex GUI and a simple GUI. In this way, power consumption of the GPU and the electronic device is relatively high, and energy efficiency of the GPU and the electronic device is relatively low.

In particular, for the electronic device having a relatively small screen, such as the wearable device, only a simple GUI needs to be displayed in most cases, and a complex GUI is displayed in a few cases. Therefore, if the high-performance GPU is uniformly used to perform graphics display processing, power consumption of the GPU and the electronic device is relatively high, and energy efficiency of the electronic device is relatively low.

Figure 1B:
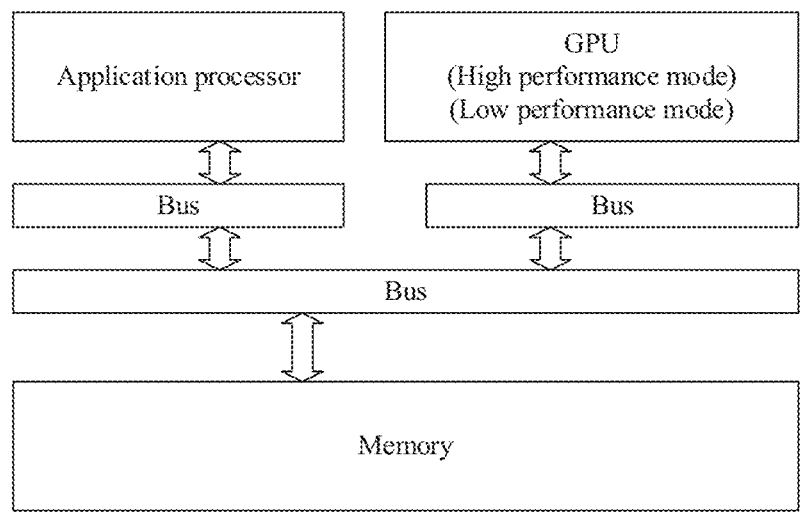

In some other conventional technologies, refer to FIG. 1B. The electronic device includes a GPU having a relatively high graphics display processing capability, and the GPU has a high performance mode and a low performance mode. The electronic device may select to perform graphics display processing in different modes of the GPU. To cooperate with the high performance mode of the GPU, power consumption of an application processor used in cooperation with the GPU is relatively high, and power consumption of a basic system such as a memory, a communications bus (also referred to as a bus), a dominant frequency clock, or a power supply used in cooperation with the GPU is also relatively high. Therefore, even if the low performance mode of the GPU is used, power consumption of the basic system used in cooperation with the GPU is still relatively high, overall power consumption of the electronic device is still relatively high, and energy efficiency of the electronic device is still relatively low.

Figure 1C:
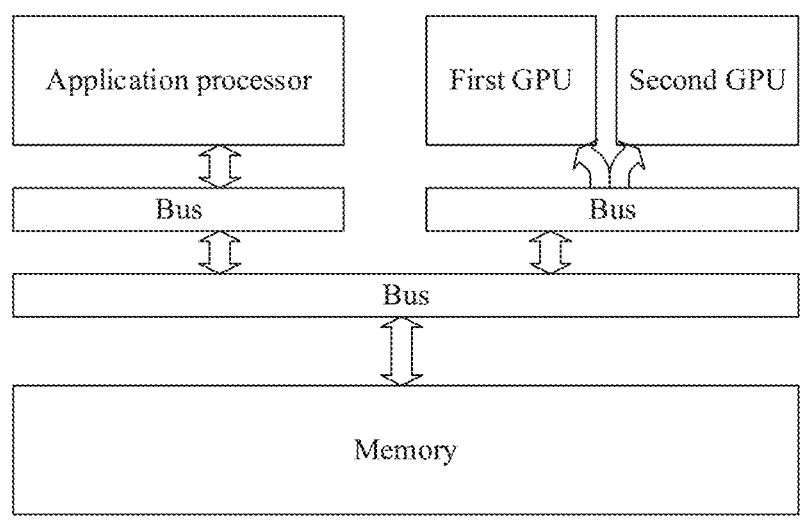

In some other conventional technologies, refer to FIG. 1C. The electronic device includes a high-performance first GPU and a low-performance second GPU. The electronic device may use, through allocating, the first GPU or the second GPU to perform graphics display processing. However, both the first GPU and the second GPU use a same basic system such as a memory, a communications bus, a dominant frequency clock, or a power supply. To cooperate with the high-performance first GPU, the basic system such as the memory, the communications bus, the clock, or the power supply has relatively good performance and relatively high power consumption. Therefore, even if the electronic device uses a low-performance GPU to perform graphics display processing, power consumption of the basic system is still relatively high, overall power consumption of the electronic device is still relatively high, and energy efficiency of the electronic device is still relatively low.

An embodiment of this application provides an energy-efficient display processing method, and the method may be applied to an electronic device. The electronic device may include a plurality of graphics processing subsystems. Different graphics processing subsystems may include graphics processing units with different performance, and application processors and basic systems that are used in cooperation with the graphics processing units. In the different graphics processing subsystems, the graphics processing units have different performance, and usually have different power consumption, and the application processors and the basic systems that are used in cooperation with the graphics processing units usually have different performance and power consumption. That is, different graphics processing subsystems have different performance and power consumption.

Usually, better performance indicates higher power consumption; and poorer performance indicates lower power consumption. A high-performance graphics processing subsystem includes a high-performance graphics processing unit, application processor, and basic system. The high-performance graphics processing subsystem also has high power consumption. A low-performance graphics processing subsystem includes a low-performance graphics processing unit, application processor, and basic system. The low-performance graphics processing subsystem also has low power consumption. Compared with the high-performance graphics processing subsystem, the low-performance graphics processing subsystem requires a lower power supply voltage, and therefore, power consumption may be reduced exponentially.

In this embodiment of this application, for to-be-displayed GUIs of different complexity, the electronic device can switch to use graphics processing subsystems with different performance and different power consumption for display processing. However, different power consumption of graphics processing subsystems used in the electronic device indicates different overall power consumption of the electronic device. For example, for a high-complexity GUI, the electronic device may use a graphics processing subsystem with high performance and high power consumption to perform processing; and for a low-complexity GUI, the electronic device may use a graphics processing subsystem with low performance and low power consumption to perform processing, instead of using a unified graphics processing subsystem with high performance and high power consumption to perform processing. In other words, the electronic device may balance display processing performance and power consumption of different to-be-displayed GUIs, to implement optimal energy efficiency for the different to-be-displayed GUIs. Therefore, the plurality of graphics processing subsystems in the electronic device have relatively low average power consumption and relatively high average energy efficiency. In addition, the plurality of graphics processing subsystems have relatively high overall energy efficiency and relatively low overall power consumption. Therefore, energy efficiency of the electronic device for graphics display processing is relatively high, and overall power consumption of the electronic device is relatively low.

GUIs of different complexity correspond to different display task magnitudes. A complex GUI is a GUI having a heavyweight display task, and a simple GUI is a GUI having a lightweight display task. The complexity of the GUI is associated with one or more of the following: a quantity of graphic elements included in the GUI, resolution of the GUI, whether the GUI includes a 3D image, whether the GUI rotates, whether the GUI is scaled up or down, whether a graphic included in the GUI is moved, whether the GUI includes a dynamic graph, or the like. For example, a GUI with a relatively small quantity of graphic elements may be a simple GUI, and a GUI with a relatively large quantity of graphic elements may be a complex GUI. For another example, a GUI with low resolution may be a simple GUI, and a GUI with high resolution may be a complex GUI. For another example, a simple GUI includes a static graph; a relatively complex GUI includes a movable, scalable, or 2D rotatable dynamic graph, or the like; and a more complex GUI includes a 3D stereoscopic graph, a 3D rotatable or 3D dynamically changing graph, or the like.

For example, the electronic device in this embodiment of this application may be a wearable device, a mobile phone, an augmented reality (augmented reality, AR)/virtual reality (virtual reality, VR) device, a tablet computer, a notebook computer, a vehicle-mounted device, an ultra-mobile personal computer (ultra-mobile personal computer, UMPC), a netbook, a personal digital assistant (personal digital assistant. PDA), or the like. A specific type of the electronic device is not limited in this embodiment of this application. In particular, the electronic device may be an electronic device that displays a complex GUI in some scenarios and displays a simple GUI in some other scenarios.

Figure 2:
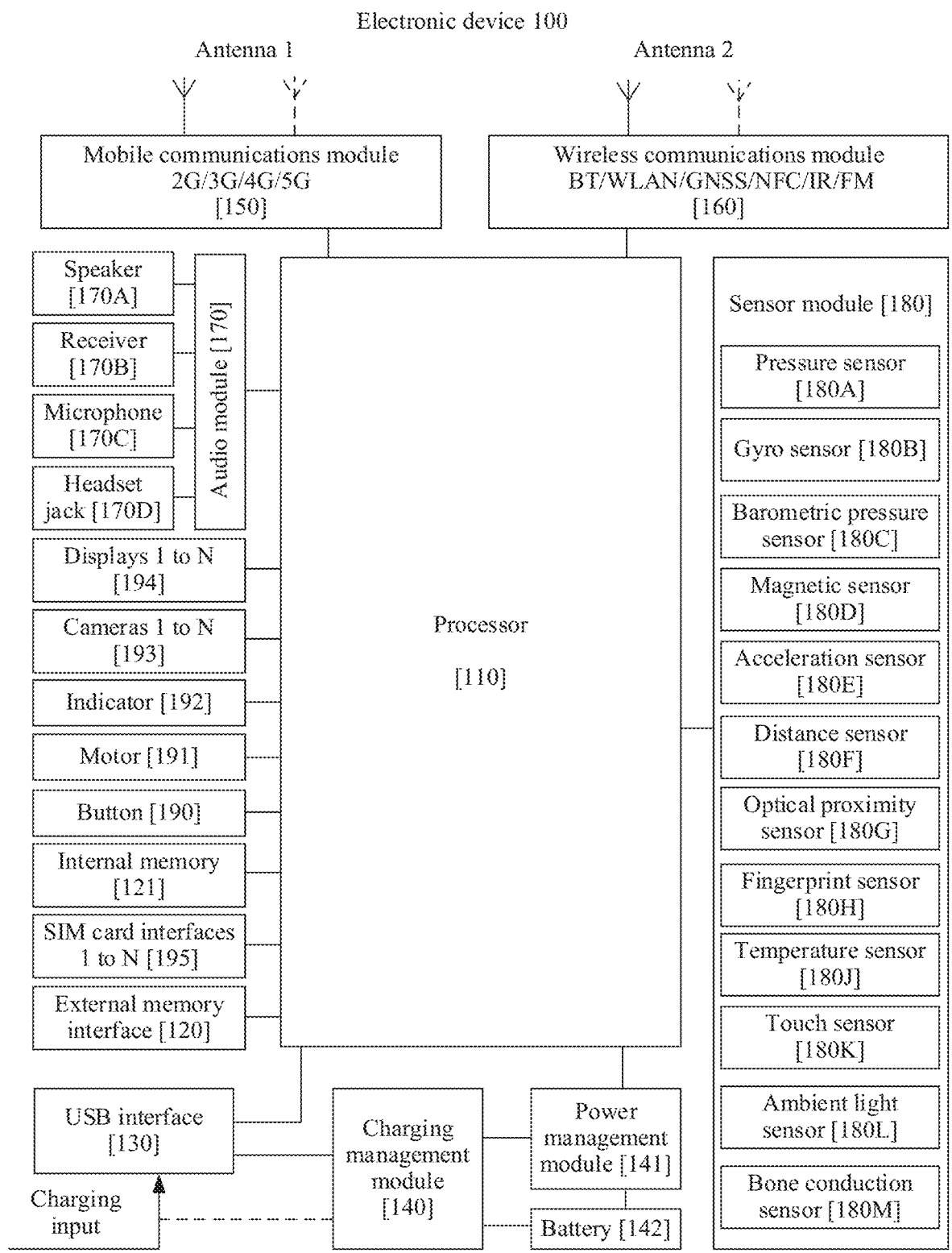
FIG. 2 is a schematic diagram of a structure of an electronic device according to an embodiment of this application.

For example, FIG. 2 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, refer to FIG. 3. The processor 110 may include a plurality of graphics processing subsystems, a modem processor, an image signal processor (image signal processor, ISP), a controller, a memory, a video codec, a digital signal processor (digital signal processor. DSP), a baseband processor, a neural-network processing unit (neural-network processing unit, NPU), a voice subsystem, a display subsystem, a sensor subsystem, a clock/voltage domain subsystem, a system power management (power management, PM) core, a secure element (secure element, SE) and/or a short-distance processor, and/or the like. Different processing units may be independent components, or may be integrated into one or more processors.

The graphics processing subsystem includes a graphics processing unit (for example, a graphics processing unit, GPU), an application processor (application processor. AP) and a basic system that are used in cooperation with the graphics processing unit, and the like. The basic system may include a communications bus, a memory, a dominant frequency clock, a power supply, or the like that are used in cooperation with the graphics processing unit. Performance, power consumption, and energy efficiency of application processors, graphics processing units, and basic systems in different graphics processing subsystems are different. That is, different graphics processing subsystems have different performance, power consumption, and energy efficiency. Different graphics processing subsystems may be on a same chip, or may be on different chips.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The charging management module 140 is configured to receive charging input from a charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

The clock/voltage domain subsystem is also referred to as a clock/power network. The processor 110 may be a system on a chip (system on a chip, SoC). The clock/voltage domain subsystem may receive a clock and a voltage that are sent by an off-chip power management module of the SoC, and further generate, based on the clock and the voltage, a working clock and a working voltage that are required by each component/module (for example, the graphics processing unit or the application processor) in the SoC. Optionally, each component/module may have an independent clock/voltage domain subsystem.

The system PM core is also referred to as a PM processor or a system controller. Different from an external power management module of the SoC, the system PM core performs binary processing on a digital signal. A core of the system PM core is usually a processor, namely, a core configured to control power consumption. The system PM core may run power consumption management software, and allocate a working-required clock and working voltage to each component in the SoC, to control a domain clock and a domain voltage of each component. The system PM core can control a total clock and voltage that are generated by the power management module and that serve the entire system, and can also control the clock/voltage domain subsystem to generate a working clock and voltage that belong to each component (for example, the graphics processing unit or the application processor).

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, Zigbee, an infrared (infrared, IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The short-distance processor, namely, a short-distance baseband communications processing unit, may include a central processing unit (central processing unit, CPU) or a DSP, and runs short-distance communications protocol software. The short-distance processor may further include a hardware accelerator. Alternatively, the short-range processor may be integrated with a short-range communications chip in the wireless communications module, to perform all short-range communications processing such as analog, radio frequency, digital, and communications protocol processing.

The electronic device 100 implements a display function by using the graphical processing unit, the display 194, the application processor, and the like. The graphical processing unit is a microprocessor for image processing, and is connected to the display 194 and the application processor. The graphical processing unit is configured to: perform mathematical and geometric calculation, and render an image. The processor 110 may include one or more graphical processing units that execute program instructions to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like.

The display subsystem is configured to interconnect to the display 194 to perform display processing on a to-be-displayed image generated by the CPU or the GPU. Different from specific display image pixel-level processing performed by the GPU, this component performs desktop-level display processing such as brightness and contrast adjustment and overlay (overlay) of a plurality of graphics layers/windows.

The electronic device 100 can implement a photographing function by using the ISP, the camera 193, the video codec, the graphical processing unit, the display 194, the application processor, and the like.

The ISP is configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more types of video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, can be implemented through the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external memory card.

The internal memory 121 may be configured to store computer-executable program code, and the executable program code includes instructions. The processor 110 runs the instructions stored in the internal memory 121 to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer functional module through the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The voice subsystem is configured to perform digital voice signal processing, for example, voice effect enhancement and voice encoding/decoding, and may include an independent CPU or DSP, or may include a necessary hardware accelerator. The encoding herein may include voice encoding, to further compress and encode a voice signal to obtain a signal suitable for communications, for example, adaptive multi-rate audio compression (adaptive multi-rate compression, AMR) and enhanced voice service (enhanced voice service, EVS) voice signals. The encoding may further include audio encoding, to obtain an encoding format suitable for music storage or playback, for example, an mp3 format.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is applied to the display 194, the electronic device 100 detects intensity of the touch operation based on the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation strength is less than a first pressure threshold is performed on an SMS message application icon, an instruction for viewing an SMS message is executed, or when a touch operation whose touch operation strength is greater than or equal to a first pressure threshold is performed on an SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 shakes, calculates, based on the angle, a distance for which a lens module needs to compensate, and allows the lens to eliminate the shake of the electronic device 100 through reverse motion, to implement image stabilization. The gyro sensor 180B may also be used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, magnitude and a direction of gravity may be detected. The acceleration sensor 180E may be further configured to recognize a posture of the electronic device, and is used in screen switching between a landscape mode and a portrait mode, a pedometer, or another application.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application access locking, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor close to the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may parse out a voice signal based on the vibration signal of the vibration bone of the vocal-cord part that is obtained by the bone conduction sensor 180M, to implement a voice function. The application processor may parse heart rate information based on the blood pressure beating signal obtained by the bone conduction sensor 180M, to implement a heart rate detection function.

The sensor subsystem is connected to a sensor, and includes a processor for processing sensor data. The processor may be a CPU or a DSP, and is configured to collect, classify, identify, and process the sensor data. Optionally, the sensor subsystem may share a same processor with the voice subsystem. For example, one DSP may be used to process a sensor signal and a voice signal.

The SE is configured to process confidential information, for example, run bank card payment software or perform identity authentication, and has an independent memory and processor (different from a main CPU) inside.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

Figure 3:
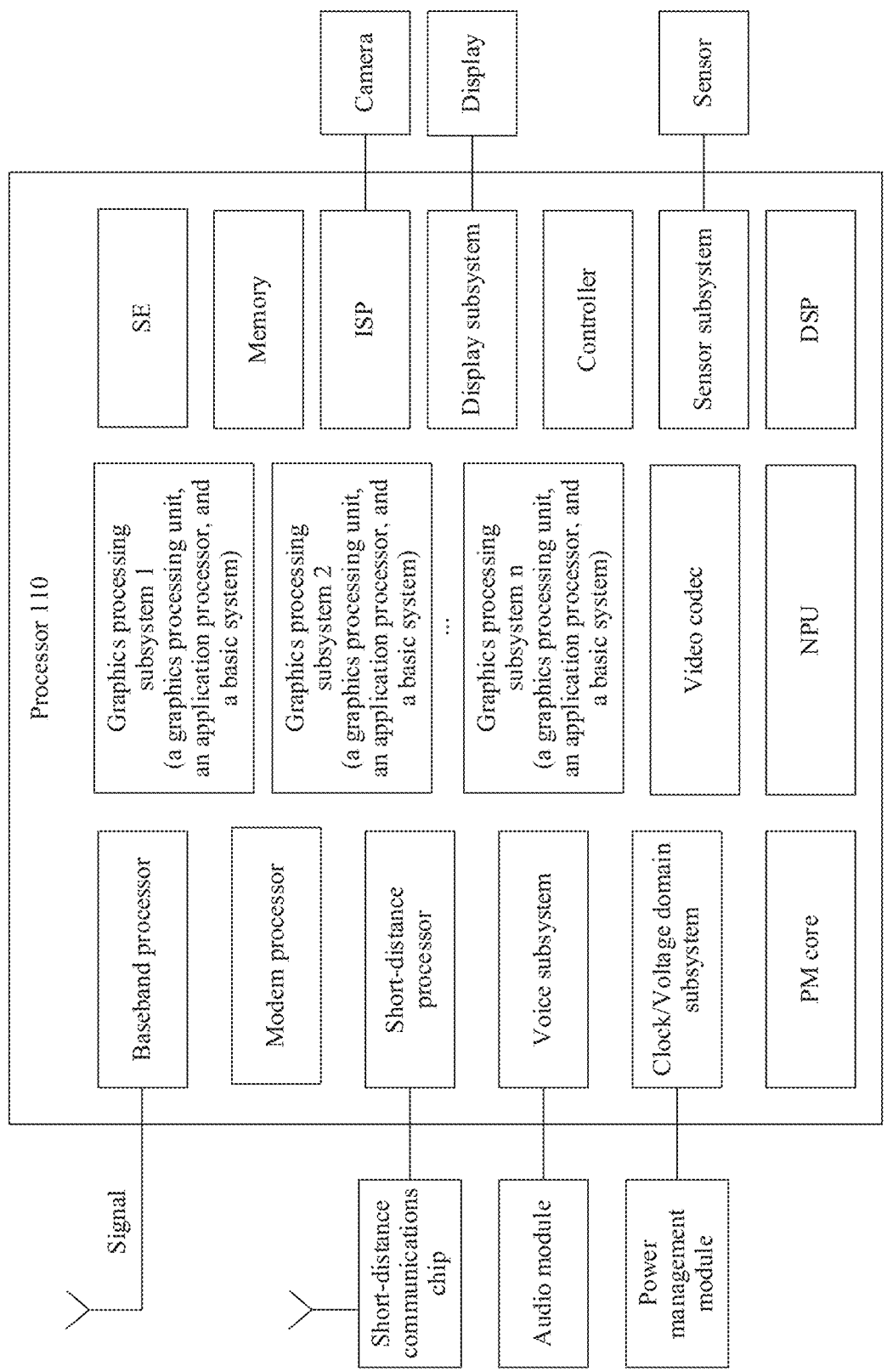
FIG. 3 is a schematic diagram of a structure of a processor according to an embodiment of this application.

In this embodiment of this application, as shown in FIG. 3, the processor 110 may include a plurality of graphics processing subsystems with different performance, power consumption, and energy efficiency. The electronic device 100 may use, based on complexity (or a display task magnitude) of a to-be-displayed GUI, a graphics processing subsystem whose performance and power consumption match the complexity of the GUI. For example, for a high-complexity GUI, the electronic device 100 may use a graphics processing subsystem with high performance and high power consumption to perform processing; and for a low-complexity GUI, the electronic device 100 may use a graphics processing subsystem with low performance and low power consumption to perform processing, instead of using the graphics processing subsystem with high performance and high power consumption to perform processing. In other words, the processor 110 may balance display processing performance and power consumption of different to-be-displayed GUIs, to implement optimal energy efficiency for the different to-be-displayed GUIs. This processing manner can improve overall energy efficiency (or referred to as average energy efficiency) of the plurality of graphics processing subsystems in the electronic device 100, improve energy efficiency of the electronic device 100 for graphics display processing, and reduce overall power consumption of the electronic device 100.

Figure 4:
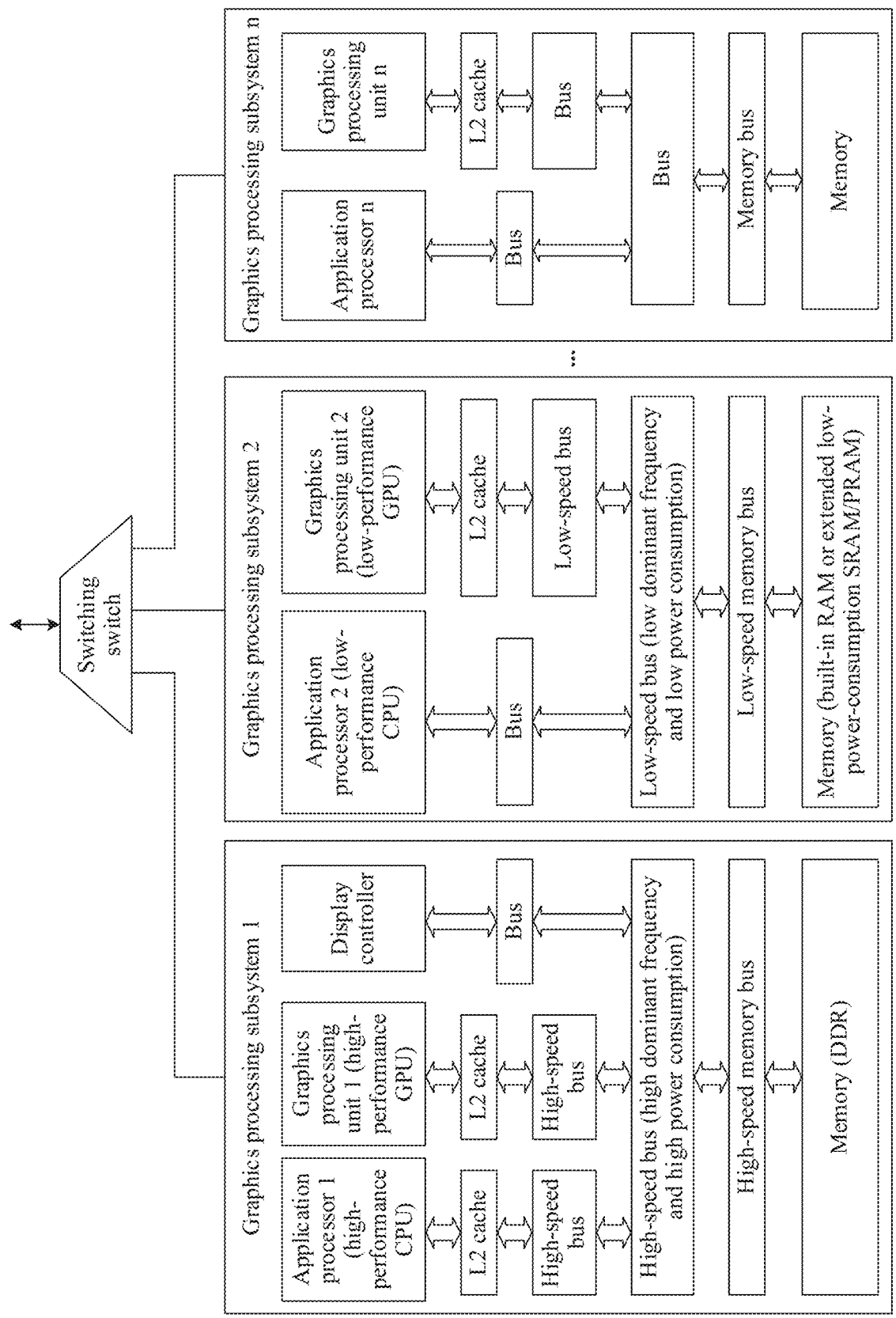
FIG. 4 is a schematic diagram of a structure of a plurality of graphics processing subsystems according to an embodiment of this application.

For example, FIG. 4 is a schematic diagram of a structure of the plurality of graphics processing subsystems in the processing subsystem may be a GPU, and a graphics processing unit in a low-performance graphics processing subsystem may be a hardware graphics rendering unit, a graphics accelerator, or the like.

In a graphics processing subsystem with relatively high performance, a display controller may be further configured to cooperate with a graphics processing unit to perform display control. Caches (cache) (for example, L2 caches) or the like may be further configured for an application processor and the graphics processing unit. A high-speed bus and a low-speed bus have different data transmission rates, and correspond to different dominant frequencies, different performance and power consumption of dominant frequency clocks, and different power consumption of power supplies. In addition, the high-performance graphics processing subsystem 1 is provided with a high-speed memory, which may be, for example, a low power double data rate 4 (low power double data rate 4, LPDDR4x) or a double data rate synchronous dynamic random access memory (double data rate synchronous dynamic random access memory, DDR SDRAM). The low-performance graphics processing subsystem 2 is provided with a low-speed memory, which may be, for example, a built-in random access memory (random access memory, RAM), a static random access memory (static random access memory, SRAM), or a pseudo static random access memory (pseudo static random access memory, PSRAM).

For example, for related parameters of the application processors and the graphics processing units in the different graphics processing subsystems, refer to Table 1.

TABLE 1

Figure 5:
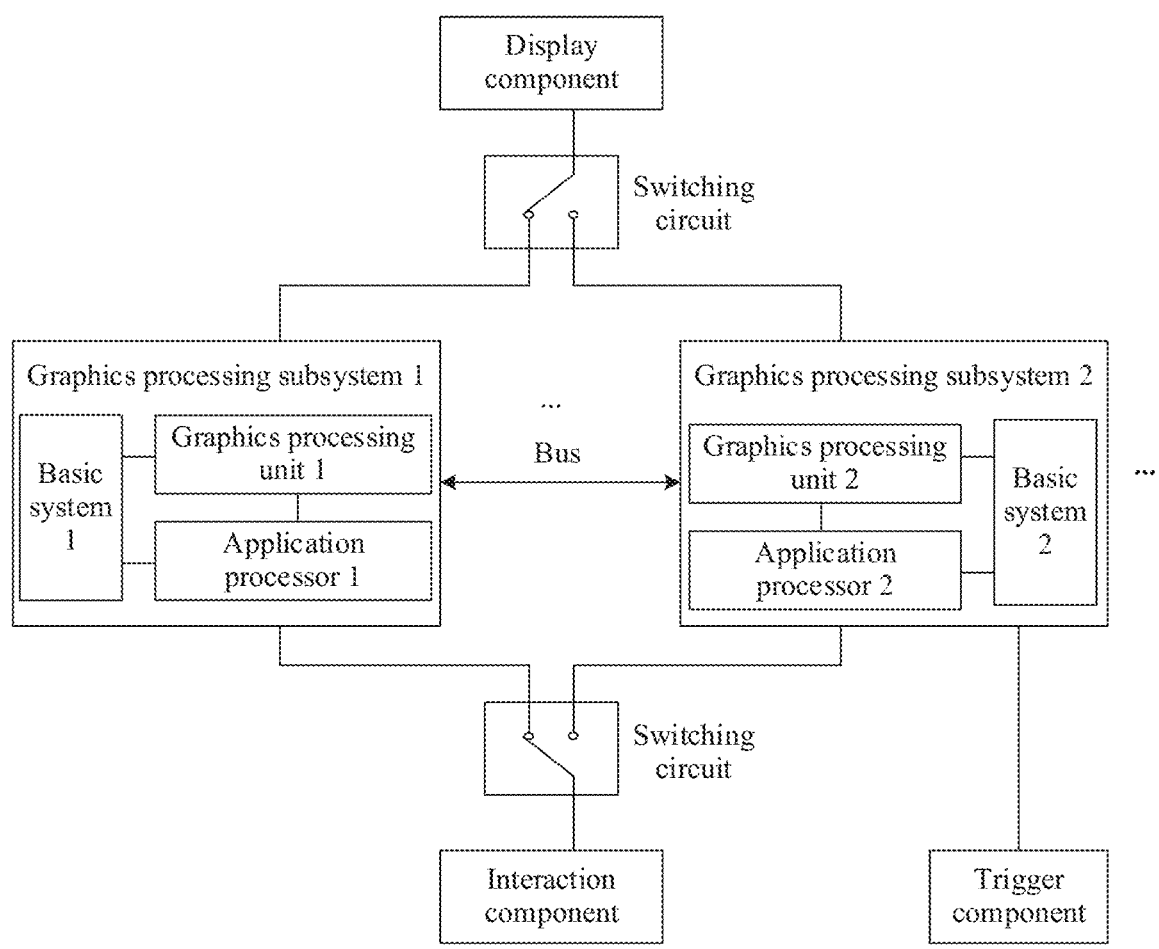
FIG. 5 is a schematic diagram of a connection of graphics processing subsystems according to an embodiment of this application.

| System | Parameter | | | | | | | |
|---|---|---|---|---|---|---|---|---|
| | Application processor | Dominant frequency of the application processor | Graphics processing unit | Dominant frequency of the graphics processing unit | Dominant frequency of a memory bus | Bit width of a memory | Memory | Bandwidth of the memory |
| Graphics processing subsystem 1 | Ctx-A53 | 1.7 GHz | MailG51 | 800 MHz | 1666 MHz | 64 bits | LPDDR 4x | 13 GBps |
| Graphics processing subsystem 2 | M33 | 200 MHz | MailT650 | 400 MHz | 400 MHz | 64 bits | RAM/ SRAM/ PSRAM | 3.2 GBps |
| ... | ... | ... | ... | ... | ... | ... | ... | ... |
| Graphics processing subsystem n | M33 | 96 MHz | Hardware graphics rendering unit such as DMA2D | 200 MHz | 200 MHz | 32 bits | PSRAM/ DRAM | 0.8 GBps | processor 110. The processor 110 includes a graphics processing subsystem 1, a graphics processing subsystem 2, a graphics processing subsystem n, and the like. Different graphics processing subsystems include application processors, graphics processing units, and basic systems that have different performance and power consumption. For example, performance and power consumption of the graphics processing subsystem 1 and internal components thereof are relatively high, and performance and power consumption of the graphics processing subsystem 2 and internal components thereof are relatively low. For example, a graphics processing unit in a high-performance graphics For a connection relationship between the graphics processing subsystem and another component of the electronic device 100, refer to FIG. 5. As shown in FIG. 5, the electronic device 100 may further include an interaction component, configured to perform an interaction operation between a user and the electronic device 100. For example, the interaction component may include a touchscreen component, a button component, a voice component, or the like. The interaction component may be connected to the different graphics processing subsystems through switching via a switch (for example, a single pole double throw (single pole double throw, SPDT) switch) or another logic switching circuit. Information may be exchanged between the touchscreen component and the SPDT switch or the another logic switching circuit, and between the SPDT switch or the another logic switching circuit and the graphics processing subsystem through a touchscreen data interface (for example, an I2C interface).

In some other embodiments, the electronic device 100 may use software rather than the SPDT switch or the another logic switching circuit to control the interaction component to be connected to the different graphics processing subsystems through switching.

As shown in FIG. 5, the electronic device 100 may further include a display component. The display component includes a screen configured to display a GUI. In some technical solutions, the display component may be connected to the different graphics processing subsystems through switching via an SPDT switch or another logic switching circuit. Information may be exchanged between the SPDT switch or the another logic switching circuit and the graphics processing subsystem, or between the SPDT switch or the another logic switching circuit and the display component through a display interface (for example, an MIPI-DSI interface or a QSPI interface). In some other technical solutions, the display component may keep connected to each graphics processing subsystem.

As shown in FIG. 5, the different graphics processing subsystems are connected through a bus, so that the different graphics processing subsystems exchange information such as a graphics processing subsystem switching notification. In this way, the electronic device 100 may switch to use the different graphics processing subsystems to display GUIs with different complexity.

In this embodiment of this application, the electronic device 100 includes an input component. The input component may include the foregoing interaction component, and may further include a trigger component such as a sensor, a wireless connection component, or a camera. For example, the sensor may include an action sensor, an acceleration sensor, or a barometric pressure sensor. The wireless connection component may include a short-range wireless communications module, for example, a Bluetooth module, an NFC module, a Zigbee module, an infrared communications module, or a Wi-Fi module.

In some embodiments of this application, the interaction component may be connected to a currently used graphics processing subsystem. The trigger component may be connected to a specific graphics processing subsystem. The sensor and the wireless connection component in the trigger component may be connected to a graphics processing subsystem with low power consumption by default. The camera in the trigger component may be configured to capture an image, and may be connected to a graphics processing subsystem with high power consumption by default.

Figure 6:
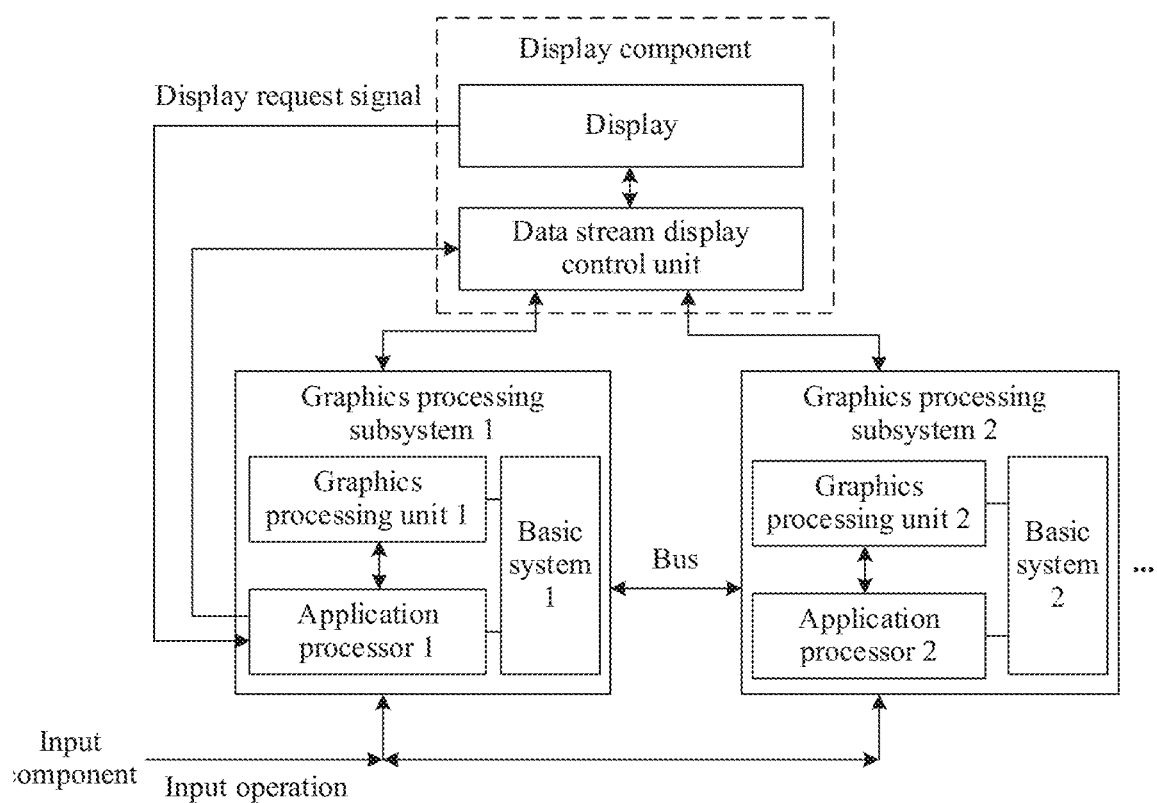
FIG. 6 is a processing flowchart of a graphics processing subsystem according to an embodiment of this application.

For example, the electronic device 100 includes a graphics processing subsystem 1 and a graphics processing subsystem 2. FIG. 6 is a diagram of a control procedure of a data processing method according to an embodiment of this application. An interaction component in an input component may be specifically connected to an application processor 1 in the graphics processing subsystem 1 that is currently used. A trigger component in the input component may be connected to an application processor (for example, an application processor 2) in a specific graphics processing subsystem (for example, the graphics processing subsystem 2). A display component may include a screen and a data stream display control unit. The screen may be connected to the application processor 1 that is currently used. The data stream display control unit may be connected to the application processor 1 and a first graphics processing unit in the graphics processing subsystem 1.

In the control procedure shown in FIG. 6, after detecting an input operation, the interaction component in the input component reports the input operation to the application processor in the currently used graphics processing subsystem. After detecting an input operation, the trigger component in the input component reports the input operation to the specific application processor in the specific graphics processing subsystem that is connected to the trigger component. If the specific graphics processing subsystem is different from the graphics processing subsystem 1 that is currently used, the specific application processor notifies the application processor 1 of the input operation.

If the application processor 1 determines, based on the input operation, that graphics processing subsystem switching does not need to be performed, the application processor 1 performs processing such as rendering on a to-be-displayed GUI by using the graphics processing unit 1. The display component periodically sends a display request signal based on a preset display period. The display request signal reaches the graphics processing unit 1 through the application processor 1. The graphics processing unit 1 sends image data of the rendered to-be-displayed GUI to the screen for display.

If the application processor 1 determines, based on the input operation, that switching to the graphics processing subsystem 2 needs to be performed, the application processor 1 releases a connection to the interaction component, controls the data stream control unit to release a connection to the display component, and notifies the application processor 2 to perform graphics processing subsystem switching. The application processor 2 establishes a connection to the interaction component, and controls the data stream control unit to establish a connection between the graphics processing subsystem 2 and the display component. The application processor 2 performs processing such as rendering on the to-be-displayed GUI by using a graphics processing unit 2 in the graphics processing subsystem 2. The display component periodically sends a display request signal based on the preset display period. The display request signal reaches the graphics processing unit 2 through the application processor 2. The graphics processing unit 2 sends image data of the rendered to-be-displayed GUI to the screen for display.

The following describes an energy-efficient display processing method provided in an embodiment of this application by using an example in which an electronic device is a smartwatch having the structure shown in FIG. 2 to FIG. 5 and the smartwatch includes a high-performance graphics processing subsystem 1 and a low-performance graphics processing subsystem 2.

The smartwatch may have a plurality of functions. For example, the smartwatch may have a plurality of functions such as displaying time, answering/making calls, reminding through an alarm clock, performing translation, taking photos, recording videos, playing music, playing videos, synchronizing messages received/sent by a mobile phone through Bluetooth, recording exercise, performing navigation, serving as a compass, monitoring sleep, monitoring a heart rate, making an emergency call, or serving as a pedometer. The smartwatch may implement these functions by using a system application supported by a system of the smartwatch or by using a third-party application.

In some embodiments of this application, after an input component of the smartwatch detects an input operation, an application processor in a currently used graphics processing subsystem may be triggered to determine whether to perform graphics processing subsystem switching. As described above, after an interaction component in the input component detects an input operation, the interaction component in the input component may report the input operation to a currently used application processor; or a trigger component in the input component reports the input operation to a connected specific application processor, and then the specific application processor notifies a currently used application processor of the input operation. After learning of the input operation, the currently used application processor may determine, based on complexity of a to-be-displayed GUI, whether to perform graphics processing subsystem switching.

Therefore, the smartwatch can adaptively switch, in response to triggering of the input operation, to a graphics processing subsystem whose performance and power consumption match the complexity of the to-be-displayed GUI. For example, higher complexity of the to-be-displayed GUI indicates higher performance and power consumption of a graphics processing subsystem that the smartwatch switches to; and lower complexity of the to-be-displayed GUI indicates lower performance and power consumption of a graphics processing subsystem that the smartwatch switches to. In this way, unlike that in the conventional technology, the smartwatch does not need to always use a same GPU with high performance and high power consumption to display all GUIs.

In other words, the electronic device may balance display processing performance and power consumption of different to-be-displayed GUIs, to implement optimal energy efficiency for the different to-be-displayed GUIs. Therefore, in the solution provided in this embodiment of this application, graphics processing subsystems with different performance and power consumption may be switched to in real time based on complexity of to-be-displayed GUIs. This reduces overall power consumption of a plurality of graphics processing subsystems, improves overall energy efficiency (or referred to as average energy efficiency) of the plurality of graphics processing subsystems, reduces overall power consumption of the smartwatch, and improves overall energy efficiency of the smartwatch.

Complexity of to-be-displayed GUIs corresponding to different operating scenarios of the smartwatch is different. In some embodiments of this application, a first correspondence is preset in an application processor of each graphics processing subsystem. For example, the first correspondence may be set in a task list in a memory of each application processor. The first correspondence is used to indicate a correspondence between a target graphics processing subsystem and both an operating scenario and an input operation.

In the first correspondence, complexity of a to-be-displayed GUI corresponding to an operating scenario and an input operation matches performance and power consumption of a corresponding target graphics processing subsystem. That is, higher complexity of the to-be-displayed GUI corresponding to the operating scenario and the input operation in the first correspondence indicates higher performance and power consumption of the corresponding target graphics processing subsystem in the first correspondence. Lower complexity of the to-be-displayed GUI corresponding to the operating scenario and the input operation in the first correspondence indicates lower performance and power consumption of the corresponding target graphics processing subsystem in the first correspondence.

In this way, the smartwatch may adaptively switch, based on the first correspondence, to use the target graphics processing subsystem whose performance and power consumption match the complexity of the to-be-displayed GUI. In other words, the smartwatch may switch, in real time based on complexity of to-be-displayed GUIs, to use graphics processing subsystems with different performance and power consumption. This reduces overall power consumption of a plurality of graphics processing subsystems and overall power consumption of the smartwatch, and improves overall energy efficiency of the plurality of graphics processing subsystems and overall energy efficiency of the smartwatch.

In some embodiments, a current operating scenario of the smartwatch may be represented by using a currently displayed interface, and the first correspondence may be a correspondence between a target graphics processing subsystem and both a display interface and an input operation. After the input component detects a current first input operation, a currently used application processor is triggered to determine, based on the first correspondence, a target graphics processing subsystem corresponding to a current first display interface and the current first input operation.

If the target graphics processing subsystem is different from the currently used graphics processing subsystem, the currently used application processor determines to switch to the target graphics processing subsystem. Alternatively, if the target graphics processing subsystem is the same as the currently used graphics processing subsystem, the currently used application processor determines not to perform graphics processing subsystem switching, and continues to use the current graphics processing subsystem to perform processing such as rendering on the to-be-displayed GUI.

In this solution, a graphics processing subsystem can be adaptively switched to in real time based on the complexity of the to-be-displayed GUI corresponding to the currently displayed interface and the input operation, so that the complexity of the to-be-displayed GUI can match in real time performance and power consumption of the graphics processing subsystem that is switched to. This can reduce overall power consumption of the graphics processing subsystem and the smartwatch, and improve energy efficiency of the graphics processing subsystem and the smartwatch.

For example, for the first correspondence preset in each application processor, refer to Table 2.

TABLE 2

| First correspondence | | | |
| --- | --- | --- | --- |
| Displayed interface | Input operation | Target graphics processing subsystem | To-be-displayed GUI |
| No interface displayed in a power-off state | Operation of pressing a power button | Graphics processing subsystem 1 | 3D watch face interface |
| 3D watch face interface | Touch and hold operation on a screen | Graphics processing subsystem 2 | 2D watch face interface |
| 2D watch face interface | Touch and hold operation on the screen | Graphics processing subsystem 1 | 3D watch face interface |

TABLE 2-continued

First correspondence

| Displayed interface | Input operation | Target graphics processing subsystem | To-be-displayed GUI |
|---|---|---|---|
| No interface displayed while the screen is off after power-on | Operation of raising wrist | Graphics processing subsystem 2 | 2D watch face interface |
| 2D watch face interface | Operation of a voice indication to display a 3D watch face | Graphics processing subsystem 1 | 3D watch face interface |
| 2D watch face interface | Swipe operation on the screen | Graphics processing subsystem 2 | Application list interface |
| Application list interface | Operation of tapping a payment icon | Graphics processing subsystem 1 | Payment process interface |
| Application list interface | Operation of tapping a music icon | Graphics processing subsystem 1 | Music playback screen |
| Application list interface | Operation of tapping a game icon | Graphics processing subsystem 1 | Game interface |
| Game interface | Operation for exiting a game application | Graphics processing subsystem 2 | Application list interface |
| Monitoring application interface | Operation for establishing a wireless connection to an intelligent surveillance camera in the LAN | Graphics processing subsystem 1 | Monitoring image |
| . . . | . . . | . . . | |

The following describes the first correspondence shown in Table 2 by using an example.

For example, the smartwatch does not display an interface in a power-off state. For example, for a schematic diagram of the smartwatch in a power-off state, refer to (a) in FIG. 7. To improve visual experience of a user, as shown in (b) in FIG. 7, a cool startup animation may be displayed in a startup process. A GUI corresponding to the startup animation is relatively complex, and needs to be processed by the graphics processing subsystem 1 with high performance and high power consumption. In some embodiments, the smartwatch uses the high-performance graphics processing subsystem 1 to perform display processing by default in the startup process. A display component and an interaction component are connected to the graphics processing subsystem 1 by default. After detecting an operation of pressing a power button by the user, a button component in the interaction component reports the operation to an application processor 1 in the high-performance graphics processing subsystem 1. The application processor 1 controls the graphics processing unit 1 to perform processing such as rendering on the GUI in the startup process, and then sends image data of the generated GUI to the screen for display. The screen may be a display, or may be a touchscreen combined by a display and a touch sensor.

After the startup is completed, the to-be-displayed GUI may be a preset interface, for example, a simple GUI such as an operation guide animation after the first startup, a watch face interface, a digital time display interface, or an application list interface.

An example in which the to-be-displayed GUI is a complex operation guide animation after the startup is completed (for example, the smartwatch is powered on for the first time) is used for description. After the startup is completed, the application processor 1 does not detect an input operation used to trigger graphics processing subsystem switching. Therefore, the application processor 1 may continue to control the current graphics processing subsystem 1 to perform processing such as rendering on the to-be-displayed operation guide animation, and control the screen to display a GUI corresponding to the operation guide animation. For example, for the GUI corresponding to the operation guide animation, refer to (c) in FIG. 7.

An example in which the to-be-displayed GUI is a watch face interface after the startup is completed (for example, the smartwatch is not powered on for the first time) is used for description. After the startup is completed, the application processor 1 does not detect an input operation used to trigger graphics processing subsystem switching. Therefore, the application processor 1 may continue to control the current graphics processing subsystem 1 to perform processing such as rendering on the to-be-displayed watch face interface, and control the screen to display the watch face interface.

Figure 7:
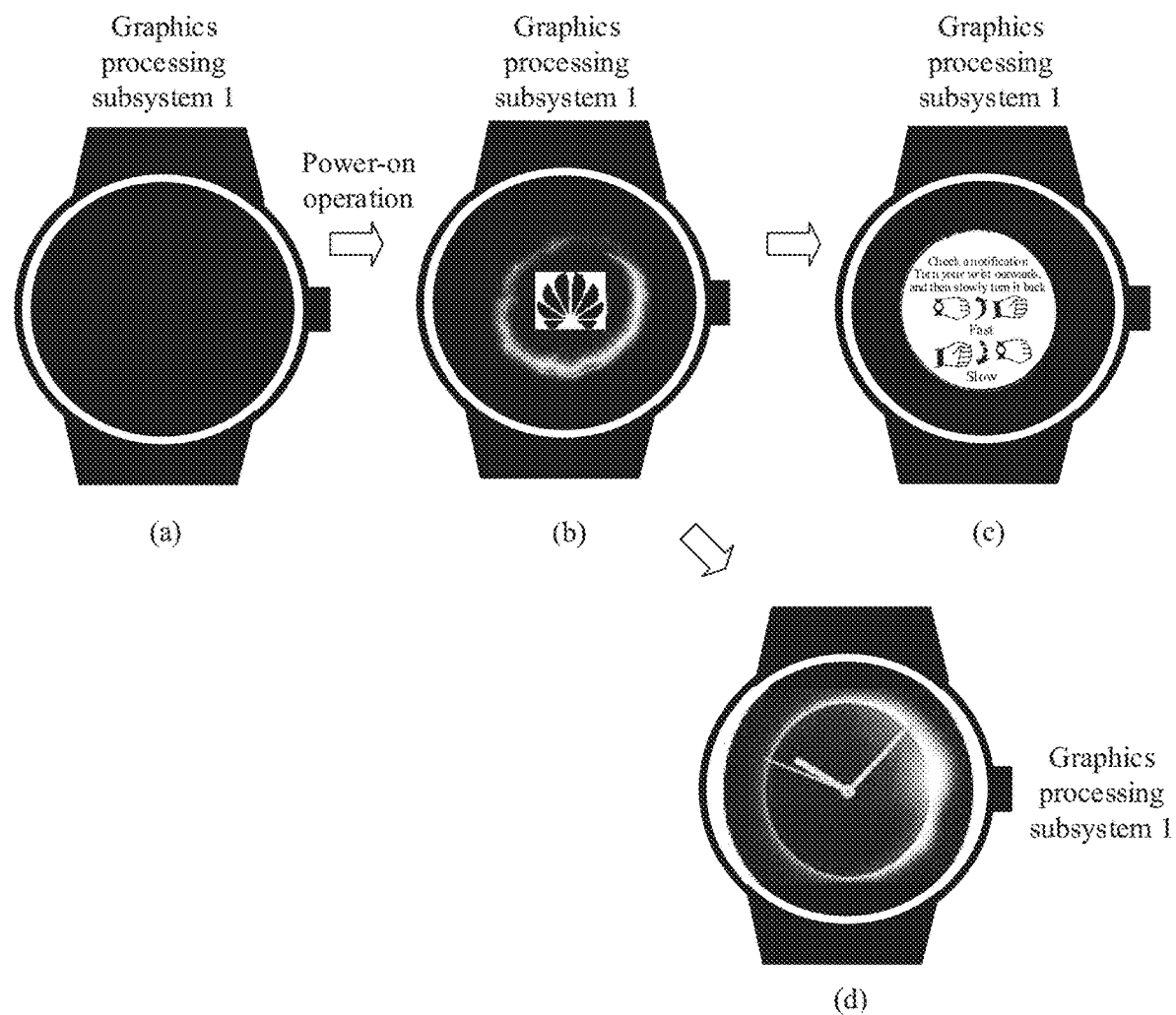
FIG. 7 is a schematic diagram of a group of interfaces of a smartwatch according to an embodiment of this application.

An example in which the smartwatch displays a 3D watch face interface with light and shadow rendering shown in (d) in FIG. 7 after the startup is completed is used for description. Refer to (a) and (b) in FIG. 8. After displaying the 3D watch face interface, the smartwatch may switch the 3D watch face interface to a 2D watch face interface in response to an operation of the user. For a switching procedure, refer to FIG. 9A and FIG. 9B. As shown in FIG. 9A and FIG. 9B, after the screen of the smartwatch displays the 3D watch face interface, if a touchscreen component detects a touch and hold operation performed by the user on the 3D watch face interface, the touchscreen component reports the touch and hold operation to the application processor 1. As shown in FIG. 9A and FIG. 9B, the application processor 1 determines, based on the first correspondence, the 3D watch face interface that is currently displayed, and the touch and hold operation on the 3D watch face interface, that the target graphics processing subsystem is the graphics processing subsystem 2, the to-be-displayed GUI is a simple 2D watch face interface, and graphics processing subsystem switching needs to be performed. Therefore, as shown in FIG. 9A and FIG. 9B, the application processor 1 may send a switching notification to an application processor 2, to indicate to switch to the graphics processing subsystem 2 for display processing.

In a graphics processing subsystem switching process, it takes a period of time to complete the graphics processing subsystem switching, and only after the graphics processing subsystem switching is completed, the to-be-displayed GUI may be displayed. Therefore, after determining, based on the first correspondence, that the target graphics processing subsystem is the graphics processing subsystem 2 with low power consumption, the application processor 1 may control the graphics processing unit 1 to render a transition interface in the graphics processing subsystem switching process, as shown in FIG. 9A and FIG. 9B. The graphics processing unit 1 may send rendered image data to the screen for display. In other words, in the switching process before the to-be-displayed GUI is displayed, the smartwatch may display the transition interface on the screen. For example, for the transition interface, refer to (c) and (d) in FIG. 8. The transition interface may continuously provide interface display for the user in the graphics processing subsystem switching process, to avoid a phenomenon such as interruption, a black screen, or screen flickering on an interface viewed by the user, and improve visual experience of the user.

The transition interface may be a preset interface, or may be an interface randomly selected from a plurality of preset interfaces, or may be a plurality of interfaces corresponding to a scale animation of a current interface. Transition interfaces corresponding to different current interfaces may be the same or may be different. Alternatively, transition interfaces corresponding to different to-be-displayed interfaces may be the same or may be different. For example, the transition interface may be a plurality of interfaces corresponding to a scale animation showing that a currently displayed interface is gradually scaled down to disappear, for example, the currently displayed interface may be scaled down to a lower right corner to disappear or scaled down to the center of the screen to disappear. In this way, the transition interface can provide continuous and dynamic visual experience for the user in the graphics processing subsystem switching process. After the to-be-displayed GUI is prepared, the smartwatch may stop displaying the transition interface, and display the prepared GUI on the screen.

After the smartwatch displays the transition interface, as shown in FIG. 9A and FIG. 9B, the application processor 1 may disconnect the graphics processing subsystem 1 from the display component. In some embodiments, as shown in FIG. 9A and FIG. 9B, after determining, based on the first correspondence, that the target graphics processing subsystem is the graphics processing subsystem 2, the application processor 1 may further release a connection to the interaction component. In some embodiments, after the graphics processing subsystem 2 is switched to, as shown in FIG. 9A and FIG. 9B, the graphics processing subsystem 1 may enter a sleep state.

After receiving the switching notification from the application processor 1, the application processor 2 takes over a subsequent process of the smartwatch. As shown in FIG. 9A and FIG. 9B, the application processor 2 connects the graphics processing subsystem 2 to the display component and the interaction component.

Then, as shown in FIG. 9A and FIG. 9B, the application processor 2 controls the graphics processing unit 2 to render the to-be-displayed 2D watch face interface, and the display component sends a display request signal based on a preset display period. The display request signal reaches the graphics processing unit 2 through the application processor 2. Because rendering and sending of an image frame consume a period of time, if the graphics processing unit 2 can send image data of a to-be-displayed GUI of a current frame to the display component before a next display request signal arrives, the graphics processing unit 2 may send the image data of the to-be-displayed GUI of the current frame to the display component. If the graphics processing unit 2 cannot send the image data of the to-be-displayed GUI of the current frame to the display component before the next display request signal arrives, to avoid an image data transmission error, the graphics processing unit 2 may send the image data of the to-be-displayed GUI of the current frame to the display component after the next display request signal arrives. Subsequently, the graphics processing unit 2 may send image data of a rendered GUI to the display component in each display period. The display component displays the GUI based on the image data received from the graphics processing unit 2.

After the smartwatch displays the 2D watch face interface, if the user does not use the smartwatch for a long time, or the user taps a screen-off control, the smartwatch turns off the screen, and the smartwatch may stop interface display. Subsequently, after the user raises wrist, a component such as an acceleration sensor may detect an input operation of raising the wrist by the user. After the user raises the wrist, a corresponding to-be-displayed GUI may still be the 2D watch face interface. The acceleration sensor may be connected to the specific graphics processing subsystem 2. The acceleration sensor may report the operation of raising the wrist by the user to the application processor 2. The application processor 2 determines, based on the stored first correspondence, a screen-off interface, and the operation of raising the wrist by the user, that the target graphics processing subsystem is the graphics processing subsystem 2 with low power consumption, the to-be-displayed GUI is a simple GUI, and graphics processing subsystem switching does not need to be performed. Therefore, the smartwatch continues to render the to-be-displayed GUI by using the graphics processing subsystem 2 that is used before the screen is turned off, and sends image data of the rendered GUI to the screen for display.

When the smartwatch displays the 2D watch face interface, if a voice component detects a wakeup keyword (for example, "xiaoyi, xiaoyi") of a voice indication of the user, the voice component reports the voice indication operation to the application processor 2. The application processor 2 wakes up the high-performance graphics processing subsystem 1, to perform subsequent voice analysis by using the high-performance application processor 1 in the high-performance graphics processing subsystem 1. If the application processor 1 performs semantic analysis on the voice indication operation of the user, and determines that the user indicates, by using a voice, to display the 3D watch face interface, the application processor 1 notifies the application processor 2 of a semantic analysis result. The application processor 2 determines, based on the first correspondence, the currently displayed 2D watch face interface, and the user voice indication operation, that the target graphics processing subsystem is the high-performance graphics processing subsystem 1, the to-be-displayed GUI is a complex GUI, and graphics processing subsystem switching needs to be performed. The application processor 2 controls rendering and displaying of the transition interface. The application processor 2 notifies the application processor 1 to perform graphics processing subsystem switching.

Figure 10:
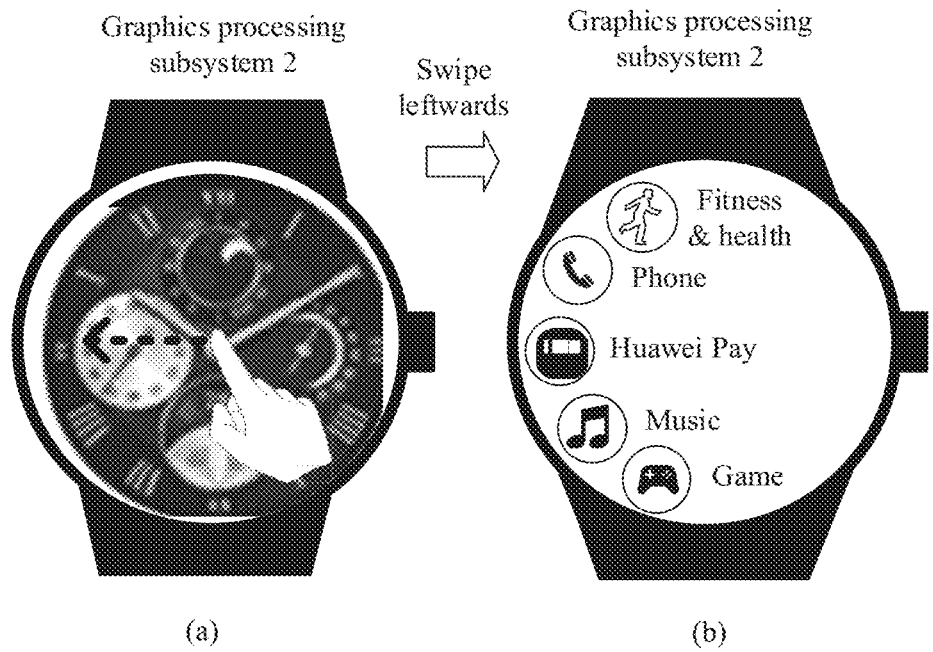
FIG. 10 is a schematic diagram of another group of interfaces of a smartwatch according to an embodiment of this application.

Refer to (a) and (b) in FIG. 10. After displaying the 2D watch face interface, the smartwatch may further display an application list interface in response to an operation of the user. The application list interface may be a static and simple GUI. For example, after the smartwatch displays the 2D watch face interface, if the touchscreen component detects an operation of swiping leftwards on the interface by the user, the operation may be reported to the application processor 2. The application processor 2 determines, based on the first correspondence, the currently displayed 2D watch face interface, and the input operation of swiping leftwards on the 2D watch face interface, that the target graphics processing subsystem is the low-performance graphics processing subsystem 2, the to-be-displayed GUI is a simple GUI, and graphics processing subsystem switching does not need to be performed. The application processor 2 controls the graphics processing unit 2 to render a to-be-displayed application list interface, and display the to-be-displayed application list interface on the screen.

Figure 11:
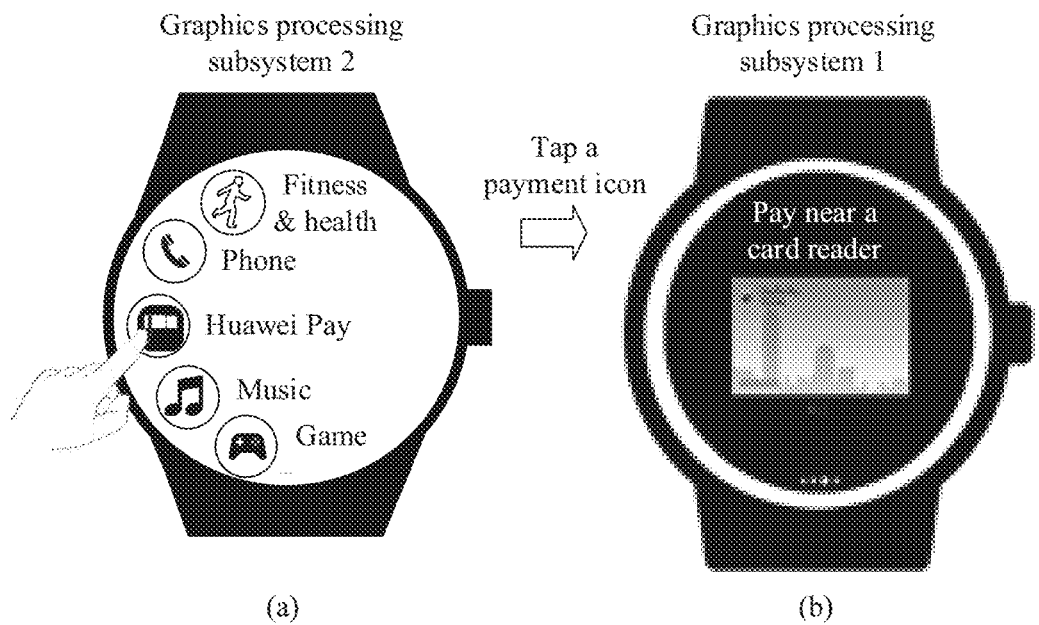
FIG. 11 is a schematic diagram of another group of interfaces of a smartwatch according to an embodiment of this application.

Refer to (a) and (b) in FIG. 11. After displaying the application list interface, the smartwatch may enter a payment procedure and display a payment interface in response to an operation of the user. A payment process usually involves a third-party application, or needs to interact with a device such as a server of a third-party application over a network. The third-party application may display a complex GUI or may display a simple GUI. Therefore, the smartwatch needs to provide a sufficient graphics processing capability for the third-party application by using a high-performance graphics processing subsystem, so that the third-party application can normally display an interface in the payment process based on the high-performance graphics processing subsystem provided by the smartwatch. Therefore, a to-be-displayed GUI corresponding to the payment process may be a complex GUI, and a corresponding target graphics processing subsystem is the high-performance graphics processing subsystem 1.

For example, after the smartwatch displays the application list interface, if the touchscreen component detects an operation of tapping a payment icon (for example, a Huawei Pay icon) on the application list interface by the user, the input operation may be reported to the application processor 2. The application processor 2 determines the corresponding high-performance graphics processing subsystem 1 based on the first correspondence, the current application list interface, and the operation of tapping the payment icon by the user. Then, the application processor 2 controls displaying of a transition interface. The application processor 2 notifies the application processor 1 to perform graphics processing subsystem switching. The application processor 1 controls the graphics processing unit 1 to render the to-be-displayed GUI in the payment process, and sends rendered image data to the screen for display.

Figure 12:
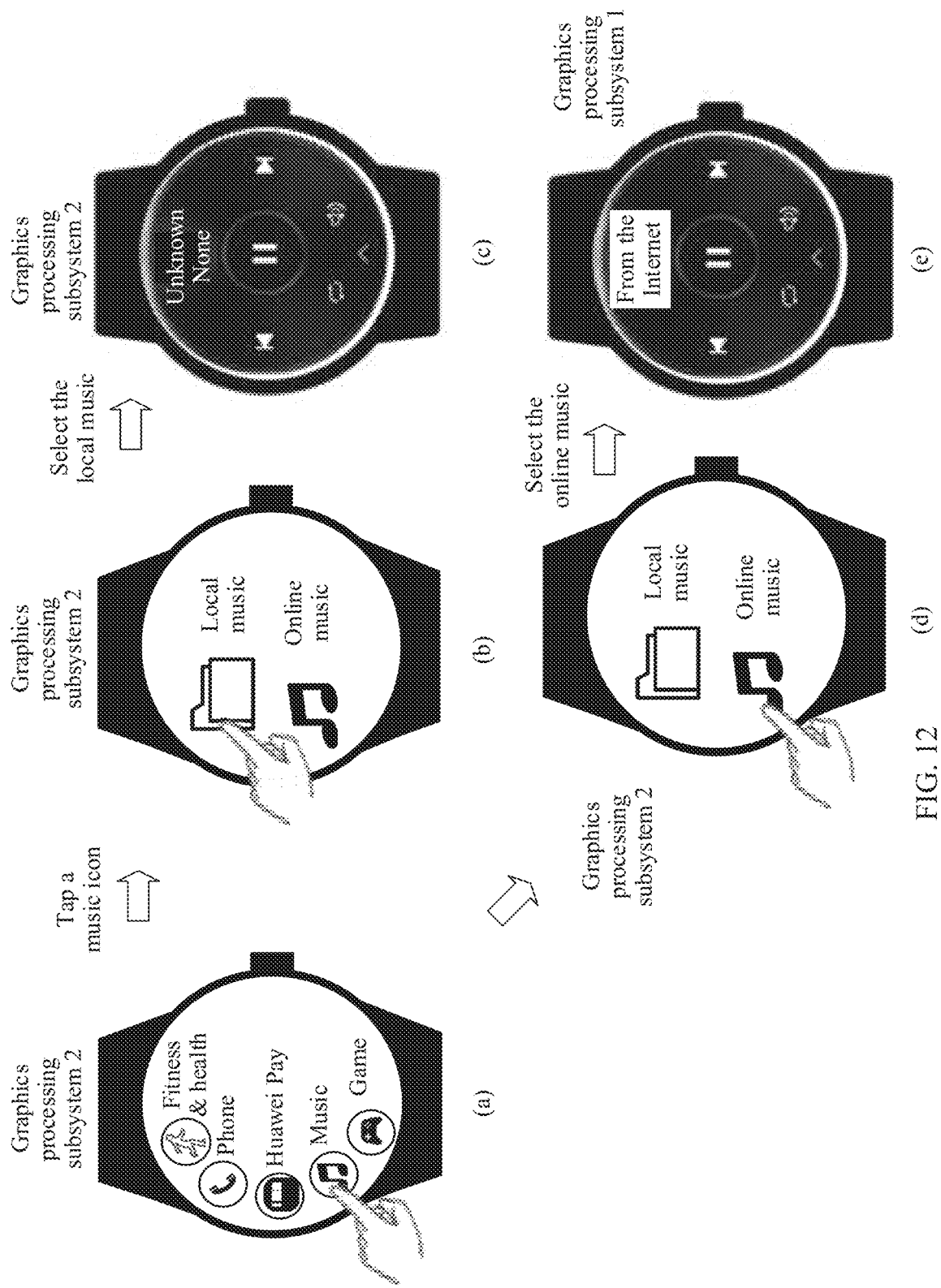
FIG. 12 is a schematic diagram of another group of interfaces of a smartwatch according to an embodiment of this application.

After displaying the application list interface, the smartwatch may further display a music interface and play music in response to an operation of the user. In some embodiments, that the smartwatch plays music includes playing local music or playing online music. If to-be-played music is the local music, the to-be-displayed GUI is a locally downloaded interface. Refer to (a) to (c) in FIG. 12, the to-be-displayed GUI may be displayed by using the low-performance graphics processing subsystem 2. If to-be-played music is the online music, complexity of the to-be-displayed GUI cannot be determined, and the complexity of the to-be-displayed GUI may be relatively high or may be relatively low. Therefore, refer to (a), (d), and (e) in FIG. 12. The to-be-displayed GUI needs to be processed by using the high-performance graphics processing subsystem 1, so that when the to-be-displayed GUI is relatively complex, a sufficient display processing capability can also be provided to render the to-be-displayed GUI.

Figure 13:
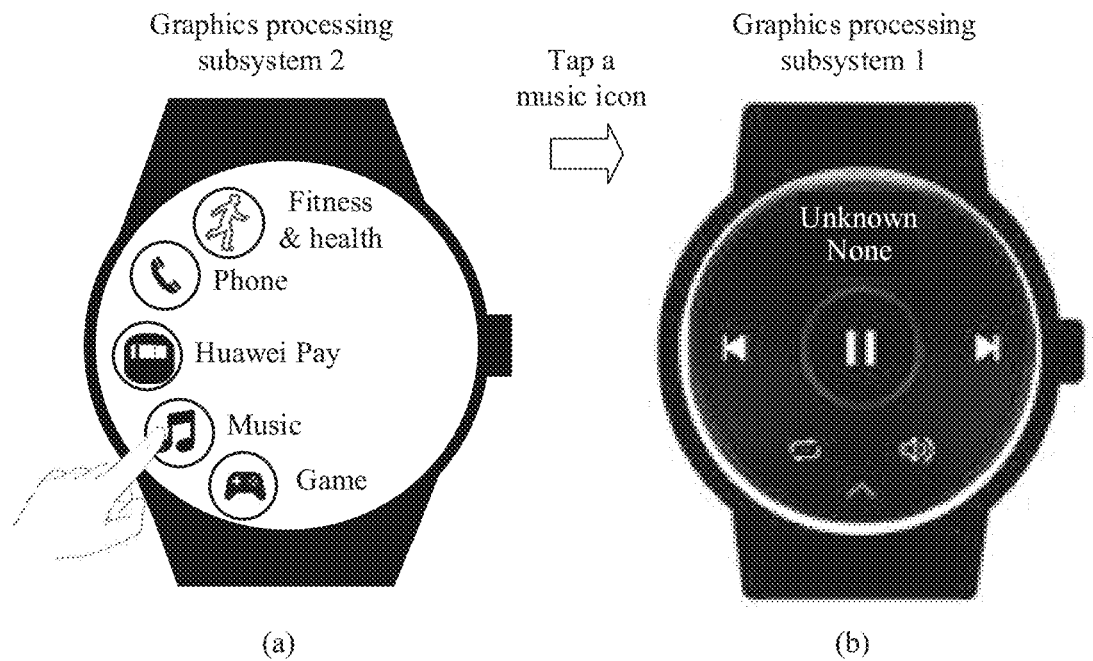
FIG. 13 is a schematic diagram of another group of interfaces of a smartwatch according to an embodiment of this application.

In some other embodiments, in a music playing scenario, the to-be-played music may be the local music or the online music. Therefore, refer to (a) and (b) in FIG. 13. Based on the first correspondence, the target graphics processing subsystem corresponding to the to-be-displayed GUI in the music playing scenario is the high-performance graphics processing subsystem 1, so that when the to-be-displayed GUI is relatively complex, the to-be-displayed GUI can be rendered normally.

For example, after the smartwatch displays the application list interface, if the touchscreen component detects an operation of tapping a music icon by the user on the interface, the input operation may be reported to the application processor 2. The application processor 2 determines, based on the first correspondence, the current application list interface, and the operation of tapping the music icon by the user, that the target graphics processing subsystem is the high-performance graphics processing subsystem 1. Then, the application processor 2 controls displaying of a transition interface. The application processor 2 notifies the application processor 1 to perform graphics processing subsystem switching. The application processor 1 controls the graphics processing unit 1 to render a to-be-displayed GUI in a music playing process, and sends rendered image data to the screen for display.

Figure 14:
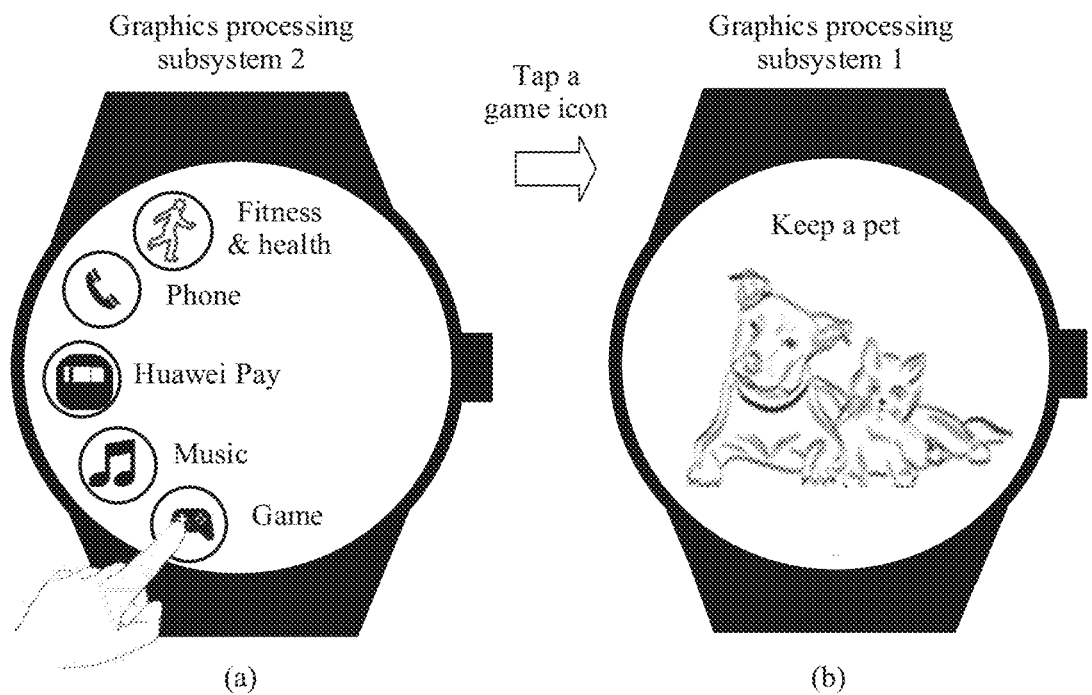
FIG. 14 is a schematic diagram of another group of interfaces of a smartwatch according to an embodiment of this application.

Refer to (a) and (b) in FIG. 14. After displaying the application list interface, the smartwatch may enter a game application and display a game interface in response to an operation of the user. The game interface usually includes a complex GUI, and a graphics processing subsystem corresponding to the game interface is the high-performance graphics processing subsystem 1. For example, after the smartwatch displays an interface of a game icon list, if the touchscreen component detects an operation of tapping a game icon (for example, a Huawei Pay icon) on the application list interface, the input operation may be reported to the application processor 2. The application processor 2 determines the corresponding high-performance graphics processing subsystem 1 based on the first correspondence, the current application list interface, and the operation of tapping the game icon by the user. Then, the application processor 2 controls displaying of a transition interface. The application processor 2 notifies the application processor 1 to perform graphics processing subsystem switching. The application processor 1 controls the graphics processing unit 1 to render a to-be-displayed GUI in a game process, and sends rendered image data to the screen for display.

In some other embodiments, the Bluetooth module in the wireless connection component of the smartwatch may keep connected to the low-performance graphics processing subsystem 2 by default. An example in which the graphics processing subsystem 2 is currently used and the screen is in a screen-off state is used for description. After the Bluetooth module detects an operation of receiving an SMS message sent by a mobile phone through Bluetooth, the operation may be reported to the application processor 2 in the graphics processing subsystem 2. The application processor 2 determines, based on the first correspondence, the SMS message receiving operation detected by the Bluetooth connection module, and the current screen-off state, that the target graphics processing subsystem is the graphics processing subsystem 2. Then, the smartwatch prompts the user with information about the SMS message, the graphics processing subsystem 2 renders an SMS message prompt interface, and the smartwatch displays the SMS message prompt interface on the screen.

For another example, the Bluetooth module in the wireless connection component of the smartwatch may keep connected to the low-performance graphics processing subsystem 2 by default. An example in which the graphics processing subsystem 1 is currently used and a currently displayed interface is a game interface is used for description. After the Bluetooth module detects an operation of receiving an SMS message sent by a mobile phone through Bluetooth, the operation may be reported to the application processor 2 in the graphics processing subsystem 2. The application processor 2 reports the operation to the application processor 1 in the currently used graphics processing subsystem 1. The application processor 1 determines, based on the first correspondence, the SMS message receiving operation detected by the Bluetooth connection module, and the currently displayed game interface, that the target graphics processing subsystem is the graphics processing subsystem 1. In some technical solutions, the smartwatch continues to render the game interface by using the graphics processing subsystem 1, but does not display an SMS message prompt interface, to avoid disturbing or interrupting a game. Subsequently, after detecting an input operation performed by the user to indicate to exit a game application, the smartwatch determines, based on the first correspondence, to switch to the graphics processing subsystem 2 to render the SMS message prompt interface. The smartwatch displays the SMS message prompt interface on the screen, to prompt the user with content of the SMS message.

In some other embodiments, the Wi-Fi module in the wireless connection component of the smartwatch keeps connected to the low-performance graphics processing subsystem 2 by default. An example in which the graphics processing subsystem 2 is currently used to perform graphics processing and an interface of a monitoring application is currently displayed is used for description. After the Wi-Fi module detects an operation of establishing a Wi-Fi connection to an intelligent surveillance camera in a smart home device in the local area network, the operation may be reported to the application processor 2 in the graphics processing subsystem 2. The application processor 2 determines, based on the first correspondence, the currently displayed interface of the monitoring application, and the detected operation of establishing the wireless connection to the intelligent surveillance camera, that the target graphics processing subsystem is the graphics processing subsystem 1. Therefore, the application processor 2 notifies the application processor 1 to perform graphics processing subsystem switching. The application processor 1 controls the graphics processing unit 1 to render a monitoring image received from the intelligent surveillance camera, and displays a rendered image on the screen.

It should be noted that the foregoing is described by using an example in which the graphics processing subsystem 1 is used by default during startup. In some other embodiments, when the smartwatch is powered on, another graphics processing subsystem may also be used for processing. For example, when the smartwatch is powered on, a historical graphics processing subsystem recently used before the smartwatch is powered off is used by default to perform display processing. After a button component detects an operation of pressing a power button by the user, the operation is reported to an application processor in the historical graphics processing subsystem. If the historical graphics processing subsystem is the same as a target graphics processing subsystem, namely, the graphics processing subsystem 1, determined by the smartwatch based on the first correspondence, the smartwatch uses the graphics processing subsystem 1 to perform processing such as rendering on a GUI in a startup process, and then sends generated image data of the GUI to the screen for display. If the historical graphics processing subsystem is different from a target graphics processing subsystem, namely, the graphics processing subsystem 1, determined by the smartwatch based on the first correspondence, the smartwatch switches to use the graphics processing subsystem 1 to perform processing such as rendering on a GUI in a startup process, and then sends generated image data of the GUI to the screen for display.

In some other embodiments, the smartwatch may not display a transition interface when performing graphics processing subsystem switching. In this way, in a graphics processing subsystem switching process, the smartwatch no longer displays an interface, and the screen of the smartwatch seen by the user in the switching process may be in a black screen state, and the user may feel that the screen flickers. Therefore, visual experience of the user is relatively poor. Therefore, compared with not displaying the transition interface, displaying the transition interface by the smartwatch can make interface display more continuous, and an interface viewed by the user more coherent. This can improve visual experience of the user.

It may be understood that, because a graphics processing subsystem is a system including an application processor and a graphics processing unit, the target graphics processing subsystem in the first correspondence may be replaced with a target application processor and/or a target graphics processing unit. An input operation and an operating scenario correspond to the target application processor and/or the target graphics processing unit, that is, correspond to a target graphics processing subsystem in which the target application processor and/or the target graphics processing unit are/is located.

It can be learned from the foregoing descriptions that different operating scenarios and different input operations correspond to different to-be-displayed GUIs, and the smartwatch uses different target graphics processing subsystems. Performance and power consumption of the used target graphics processing subsystems match the different operating scenarios and the different input operations, namely, match to-be-displayed GUIs corresponding to the different operating scenarios and input operations. Unlike the conventional technology, a same GPU with high performance and high power consumption is continuously used to perform display processing on all GUIs.

In other words, the smartwatch may adaptively switch to a graphics processing subsystem in real time based on complexity of a to-be-displayed GUI corresponding to a display interface and an input operation, so that the complexity of the to-be-displayed GUI matches performance and power consumption of the switched graphics processing subsystem, and a graphics display processing capability and power consumption are not wasted. Therefore, the smartwatch may balance display processing performance and power consumption of different to-be-displayed GUIs, to implement optimal energy efficiency for the different to-be-displayed GUIs. This can reduce overall power consumption of the graphics processing subsystem and the smartwatch, and improve energy efficiency of the graphics processing subsystem and the smartwatch.

In some other embodiments, a current operating scenario of the smartwatch may be represented by a currently detected input event. A second correspondence between an input event and a target graphics processing subsystem is preset in each application processor of the smartwatch. The application processor may determine, based on the second correspondence and the currently detected input event, whether to perform graphics processing subsystem switching. For example, for the second correspondence stored in the application processor, refer to Table 3.

TABLE 3

Second correspondence

| Input event | Target graphics processing subsystem | To-be-displayed GUI |
|---|---|---|
| Event of pressing a power button in a power-off state | Graphics processing subsystem 1 | 3D watch face interface |
| Touch and hold event on the 3D watch face interface | Graphics processing subsystem 2 | 2D watch face interface |
| Event of raising wrist in a screen-off state | Graphics processing subsystem 2 | 2D watch face interface |
| Event of a voice indication to switch to a 3D watch face | Graphics processing subsystem 1 | 3D watch face interface |
| Event of swiping on the 2D watch face interface | Graphics processing subsystem 2 | Application list interface |
| Event of establishing a wireless connection to an intelligent surveillance camera after a monitoring application is started | Graphics processing subsystem 1 | Monitoring image |
| . . . | . . . | |

For example, after detecting the event of raising the wrist in a screen-off state by a user, the smartwatch determines, based on the second correspondence, that the target graphics processing subsystem is the graphics processing subsystem 2 and the to-be-displayed GUI is the 2D watch face interface. Then, the smartwatch determines whether a graphics processing subsystem used before a screen is turned off is the same as the graphics processing subsystem 2. If the graphics processing subsystem used before the screen is turned off is the same as the graphics processing subsystem 2, the smartwatch continues to perform processing such as rendering and displaying on the to-be-displayed GUI by using the graphics processing subsystem 2. If the graphics processing subsystem used before the screen is turned off is different from the graphics processing subsystem 2, the smartwatch switches to use the graphics processing subsystem 2 to perform processing such as rendering and displaying on the to-be-displayed GUI.

In some other embodiments of this application, a third correspondence between an input operation and a graphics processing subsystem is preset in each application processor of the smartwatch. The application processor may determine, based on the third correspondence and a currently detected input operation, whether to perform graphics processing subsystem switching. That is, the smartwatch may determine a target graphics processing subsystem based on an input operation of a user, and determine whether to perform graphics processing subsystem switching. For example, for the third correspondence preset in each application processor, refer to Table 4.

TABLE 4

Third correspondence

| Input operation | Target graphics processing subsystem |
|---|---|
| Operation of shaking wrist | Graphics processing subsystem 1 |
| Operation of raising and putting down the wrist for a plurality of consecutive times | Graphics processing subsystem 2 |
| Operation of a voice indication to use the graphics processing subsystem 1 | Graphics processing subsystem 1 |
| Operation of a voice indication to use the graphics processing subsystem 2 | Graphics processing subsystem 2 |
| . . . | . . . |

For example, after detecting the operation of shaking the wrist by the user, the smartwatch may determine to use the high-performance graphics processing subsystem 1 to perform graphics display processing. After detecting the operation of raising and putting down the wrist for the plurality of consecutive times by the user, the smartwatch determines to use the low-performance graphics processing subsystem 2 to perform graphics display processing. For another example, the smartwatch determines, based on a voice indication operation of the user, to use the high-performance graphics processing subsystem 1 or the low-performance graphics processing subsystem 2. The user may determine complexity of a to-be-displayed GUI based on an actual situation, to indicate, by using an input operation, the smartwatch to use a corresponding graphics processing subsystem to perform display processing.

In some other embodiments of this application, each application processor of the smartwatch stores a fourth correspondence, and the fourth correspondence is a correspondence between an application corresponding to a to-be-displayed GUI and a target graphics processing subsystem. The application processor may determine, based on the fourth correspondence and an application corresponding to a currently to-be-displayed GUI, whether to perform graphics processing subsystem switching. For example, for the fourth correspondence stored in each application processor, refer to Table 5.

TABLE 5

Fourth correspondence

| Application corresponding to a to-be-displayed GUI | Target graphics processing subsystem |
|---|---|
| Game application | Graphics processing subsystem 1 |
| Camera application | Graphics processing subsystem 1 |
| Phone application | Graphics processing subsystem 1 |
| Setting application | Graphics processing subsystem 1 |
| Alarm clock application | Graphics processing subsystem 2 |
| Fitness and health application | Graphics processing subsystem 2 |
| . . . | . . . |

In some implementations, the smartwatch may determine, in real time, the application corresponding to the to-be-displayed GUI, to determine, based on Table 5, whether to perform graphics processing subsystem switching. In some other implementations, the smartwatch determines the application corresponding to the to-be-displayed GUI only when the smartwatch detects an input operation of a user and the input operation is used to indicate to start the application, to determine, based on Table 5, whether to perform graphics processing subsystem switching.

In some technical solutions, if a function of the application (for example, the camera application) corresponding to the to-be-displayed GUI is associated with a camera, the to-be-displayed GUI corresponds to the graphics processing subsystem 1.

In some other technical solutions, if a function of the application corresponding to the to-be-displayed GUI is associated with remote network communication, the to-be-displayed GUI corresponds to the graphics processing subsystem 1, or if a function of the application corresponding to the to-be-displayed GUI is not associated with remote network communication, the to-be-displayed GUI corresponds to the graphics processing subsystem 2.

Network communication may include near field communication and remote network communication. The near field communication may include communication technologies with a relatively short communication distance, such as Bluetooth, Wi-Fi, Zigbee, and infrared, and a communication task amount is small. The remote network communication includes 2G to 5G long-distance mobile network communication and network communication that requires TCP/IP resolution through a router. Wi-Fi communication may be classified into two types. One is remote network communication that is accessed to a wide area network, and in this case, communication is actually performed by using Ethernet. The other is near field communication that is accessed to a local area network of an IoT device. For example, a remote network communication scenario may include a 2G/3G/4G/5G-based video call, Internet-based data downloading, an Internet-based video call, or the like. For example, for the fourth correspondence stored in each application processor, refer to Table 6.

TABLE 6

Fourth correspondence

| Application corresponding to a to-be-displayed GUI | Target graphics processing subsystem |
|---|---|
| Music application (including functions of downloading and playing online music) | Graphics processing subsystem 1 |
| WeChat application (including a video call function) | Graphics processing subsystem 1 |
| Setting application | Graphics processing subsystem 2 |
| Alarm clock application | Graphics processing subsystem 2 |
| Phone application (including a video call function) | Graphics processing subsystem 1 |
| . . . | . . . |

Because a complex GUI may need to be displayed in a remote network communication process, the high-performance graphics processing subsystem 1 may be used to perform display processing, so that the smartwatch has a sufficient display processing capability for an interface related to the remote network communication. In addition, because a network disconnection problem and a network re-access problem may occur during graphics processing subsystem switching, and a network re-access process is complex and takes a relatively long time period, the smartwatch may perform graphics processing subsystem switching for the application corresponding to the to-be-displayed GUI based on whether the function of the application is associated with the remote network communication, and does not perform graphics processing subsystem switching in the application. This can avoid problems of frequent network disconnection and poor Internet access experience of the user that are caused by frequent graphics processing subsystem switching in the application.

In some implementations, the smartwatch may determine, in real time, whether the application corresponding to the to-be-displayed GUI is the application that has the function associated with the remote network communication, to determine, based on Table 6, whether to perform graphics processing subsystem switching. In some other implementations, only when the smartwatch detects the input operation of the user and the input operation is used to indicate to start the application, the smartwatch determines whether the application corresponding to the to-be-displayed GUI is the application that has the function associated with the remote network communication, to determine, based on Table 6, whether to perform graphics processing subsystem switching.

In some other technical solutions, if the application corresponding to the to-be-displayed GUI is a third-party application, the to-be-displayed GUI corresponds to the graphics processing subsystem 1; or if the application corresponding to the to-be-displayed GUI is a system application, the to-be-displayed GUI corresponds to the graphics processing subsystem 2. For example, for the fourth correspondence stored in each application processor, refer to Table 7.

TABLE 7

Fourth correspondence

| Application corresponding to a to-be-displayed GUI | | Target graphics processing subsystem |
|---|---|---|
| Third-party application | Game | Graphics processing subsystem 1 |
| | WeChat | Graphics processing subsystem 1 |
| | . . . | Graphics processing subsystem 1 |
| System application | Alarm clock | Graphics processing subsystem 2 |
| | Settings | Graphics processing subsystem 2 |
| | . . . | Graphics processing subsystem 2 |

A third-party application may display a complex GUI, or may display a simple GUI. Therefore, the smartwatch needs to open a high-performance graphics processing capability for the third-party application, so that the third-party application can normally display the complex GUI by using the high-performance graphics processing capability. For example, if the application corresponding to the to-be-displayed GUI is a third-party game application, the target graphics processing subsystem corresponding to the to-be-displayed GUI is the graphics processing subsystem 1. The smartwatch may determine, according to whether the target graphics processing subsystem is the same as a currently used graphics processing subsystem, whether to perform graphics processing subsystem switching.

In some implementations, the smartwatch may determine, in real time, whether the application corresponding to the to-be-displayed GUI is a third-party application (also referred to as a third-party application), to determine, based on Table 7, whether to perform graphics processing subsystem switching. In some other implementations, only when the smartwatch detects the input operation of the user and the input operation is used to start the application, the smartwatch determines whether the application corresponding to the to-be-displayed GUI is a third-party application, to determine, based on Table 7, whether to perform graphics processing subsystem switching.

In some other technical solutions, if the application corresponding to the to-be-displayed GUI is a third-party application, the to-be-displayed GUI corresponds to the graphics processing subsystem 1. If the application corresponding to the to-be-displayed GUI is a system application, and a function of the system application is associated with remote network communication, the to-be-displayed GUI corresponds to the graphics processing subsystem 1. Alternatively, if the application corresponding to the to-be-displayed GUI is a system application, and a function of the system application is not associated with remote network communication, the smartwatch only needs to perform processing locally or perform processing through near field communication, and the to-be-displayed GUI corresponds to the graphics processing subsystem 2. For example, for the fourth correspondence stored in each application processor, refer to Table 8.

TABLE 8

Fourth correspondence

| Application corresponding to a to-be-displayed GUI | | Target graphics processing subsystem |
|---|---|---|
| Third-party application | Game | Graphics processing subsystem 1 |
| | WeChat | Graphics processing subsystem 1 |
| | . . . | Graphics processing subsystem 1 |
| System application | Messages | Graphics processing subsystem 2 |
| | Settings | Graphics processing subsystem 2 |
| | Phone (a video call associated with a network) | Graphics processing subsystem 1 |
| | . . . | . . . |

In some other embodiments of this application, each application processor of the smartwatch stores a fifth correspondence, and the fifth correspondence is a correspondence between an application function corresponding to a to-be-displayed GUI and a target graphics processing subsystem. The application processor may determine, based on the fifth correspondence and an application function corresponding to a currently to-be-displayed GUI, whether to perform graphics processing subsystem switching. For example, for the fifth correspondence stored in each application processor, refer to Table 9.

TABLE 9

Fifth correspondence

| Function corresponding to a to-be-displayed GUI | Target graphics processing subsystem |
|---|---|
| Voice call | Graphics processing subsystem 2 |
| Video call | Graphics processing subsystem 1 |
| Play local music | Graphics processing subsystem 2 |
| Play online music | Graphics processing subsystem 1 |
| . . . | . . . |

In some implementations, the smartwatch may determine, in real time, a function corresponding to the to-be-displayed GUI, to determine, based on Table 6, whether to perform graphics processing subsystem switching. In some other implementations, only when the smartwatch detects an input operation of a user and the input operation is used to indicate to use a service function, the smartwatch determines the function corresponding to the to-be-displayed GUI, to determine, based on Table 6, whether to perform graphics processing subsystem switching.

In some other embodiments of this application, a sixth correspondence between a to-be-displayed GUI and a graphics processing subsystem is preset in an application processor. The application processor may determine, based on the sixth correspondence and a currently to-be-displayed GUI, whether to perform graphics processing subsystem switching. For example, for the sixth correspondence stored in each application processor, refer to Table 10.

TABLE 10

Sixth correspondence

| To-be-displayed GUI | Target graphics processing subsystem |
|---|---|
| Startup animation | Graphics processing subsystem 1 |
| 2D watch face interface | Graphics processing subsystem 2 |
| 3D watch face interface | Graphics processing subsystem 1 |
| Payment interface | Graphics processing subsystem 1 |
| Game interface | Graphics processing subsystem 1 |

TABLE 10-continued

Sixth correspondence

| To-be-displayed GUI | Target graphics processing subsystem |
|---|---|
| Calendar interface | Graphics processing subsystem 2 |
| . . . | . . . |

For example, if the to-be-displayed GUI is the game interface, the to-be-displayed GUI corresponds to the graphics processing subsystem 1. If a currently used graphics processing subsystem is the graphics processing subsystem 1, the smartwatch continues to render the to-be-displayed GUI by using the graphics processing subsystem 1. If a currently used graphics processing subsystem is not the graphics processing subsystem 1, the smartwatch switches to the graphics processing subsystem 1 to render the to-be-displayed GUI.

In some other embodiments of this application, a switching operation is preset in each application processor of the smartwatch, and the switching operation is one or more of input operations. If the smartwatch detects a switching operation, the smartwatch switches to another graphics processing subsystem.

For example, the smartwatch includes two graphics processing subsystems. If the smartwatch detects a switching operation by using an input component, switching is performed between the two graphics processing subsystems. For example, the switching operation may be an operation of shaking the smartwatch, an operation of tapping a switching control on a screen by a user, an operation of a voice indication of a user to perform graphics processing subsystem switching, or the like.

It should be noted that the smartwatch may need a specific processing time period to perform graphics processing subsystem switching. When the smartwatch triggers, based on an input operation of the user by using an interaction component, to determine whether to perform graphics processing subsystem switching, because the smartwatch also needs a specific time period to respond to the input operation of the user, the graphics processing subsystem switching and the response are synchronously performed. Therefore, it is not easy for the user to feel a delay caused by a switching process. When the smartwatch triggers, based on an input operation of a trigger component such as a wireless connection module, to determine whether to perform graphics processing subsystem switching, the switching is performed without user awareness. Therefore, the user does not perceive a time period consumed for performing the graphics processing subsystem switching.

In some other embodiments of this application, a target graphics processing subsystem may be associated with configuration information of a to-be-displayed interface. The configuration information may be configuration information corresponding to a previous setting operation of a user. For example, in a process of displaying a startup animation, the smartwatch performs display processing by using the graphics processing subsystem 1. After the startup animation is displayed, the to-be-displayed interface is a watch face interface. A watch face interface previously set by the user is a 2D watch face interface and corresponds to the graphics processing subsystem 2. Configuration information that corresponds to the watch face interface and that is stored in the smartwatch is a 2D watch face mode. After the startup process is completed, the smartwatch queries the configuration information corresponding to the watch face interface, and determines, based on the configuration information, that the target graphics processing subsystem corresponding to the to-be-displayed GUI is the graphics processing subsystem 2, and that the to-be-displayed GUI is a simple GUI. Therefore, the smartwatch may switch to use the graphics processing subsystem 2 to performing processing such as rendering and displaying on the to-be-displayed 2D watch face interface.

In some other embodiments of this application, the smartwatch may determine complexity of each to-be-displayed GUI in real time, to determine, in real time based on the complexity of the to-be-displayed GUI, whether to perform graphics processing subsystem switching.

For example, the smartwatch may learn and predict complexity of each to-be-displayed GUI by using an artificial intelligence (artificial intelligence, AI) module, and determine a corresponding target graphics processing subsystem based on the complexity of the to-be-displayed GUI, to determine whether to perform graphics processing subsystem switching. For example, if the smartwatch is currently using the high-performance graphics processing subsystem 1 to perform display processing on a complex game interface, the smartwatch determines, by using the AI module, that a to-be-displayed GUI of a next frame or next several frames is a simple game interface. In this case, the smartwatch switches to the low-performance graphics processing subsystem 2 for display processing.

The foregoing is described by using an example in which the interaction component in the input component is connected to the currently used graphics processing subsystem, and the trigger component is connected to a specific graphics processing subsystem. In some other embodiments, both the interaction component and the trigger component in the input component may be connected to the currently used graphics processing subsystem. If a graphics processing subsystem used by the smartwatch is switched, the input component is connected to a graphics processing subsystem that is switched to.

The foregoing is mainly described by using an example in which the electronic device is a smartwatch. The display processing method provided in embodiments of this application may be further applied to another electronic device such as a mobile phone, a tablet, or a vehicle-mounted device. Details are not described herein.

It should be noted that the foregoing is mainly described by using an example in which the electronic device includes the graphics processing subsystem 1 and the graphics processing subsystem 2. It may be understood that the electronic device may also include more than two graphics processing subsystems. For example, as shown in FIG. 4, the electronic device may further include another graphics processing subsystem such as a graphics processing subsystem n.

For example, in addition to the high-performance graphics processing subsystem 1 and the low-performance graphics processing subsystem 2, the electronic device may further include a graphics processing subsystem n with lower performance and lower power consumption. For related parameters of an application processor and a graphics processing unit in the graphics processing subsystem n, refer to Table 1.

For another example, in addition to the high-performance graphics processing subsystem 1 and the low-performance graphics processing subsystem 2, the electronic device may further include a graphics processing subsystem 3 whose performance and power consumption are between the performance and power consumption of the graphics processing subsystem 1 and the performance and power consumption of the graphics processing subsystem 2. For example, the high-performance graphics processing subsystem 1 supports a 3D rendering capability, the low-performance graphics processing subsystem 2 supports static graphics processing, and the graphics processing subsystem 3 with middle performance and power consumption supports two-dimensional graphics display processing such as 2D rotation and fade-in/fade-out.

For another example, in addition to the high-performance graphics processing subsystem 1 and the low-performance graphics processing subsystem 2, the electronic device such as a mobile phone, an AR device, or a VR device may further include a graphics processing subsystem 4 with higher performance and power consumption that is used to display 3D graphics in an AR scenario or a VR scenario.

With reference to the foregoing embodiments and related accompanying drawings, an embodiment provides a display processing method. The method may be implemented in the electronic device (for example, a smartwatch or a smart band) that has a screen and that is shown in FIG. 2 to FIG. 6. The electronic device may include a plurality of graphics processing subsystems, for example, may include a first graphics processing subsystem and a second graphics processing subsystem.

The first graphics processing subsystem includes a first graphics processing unit, a first application processor, and a first memory used in cooperation with the first application processor and the first graphics processing unit. The second graphics processing subsystem includes a second graphics processing unit, a second application processor, and a second memory used in cooperation with the second application processor and the second graphics processing unit. In addition, the first graphics processing subsystem and the second graphics processing subsystem each may further include a communications bus configured to connect components in the graphics processing subsystem. That is, different graphics processing subsystems may include different components and different basic systems. Different graphics processing subsystems have different performance, power consumption, and energy efficiency.

Figure 15:
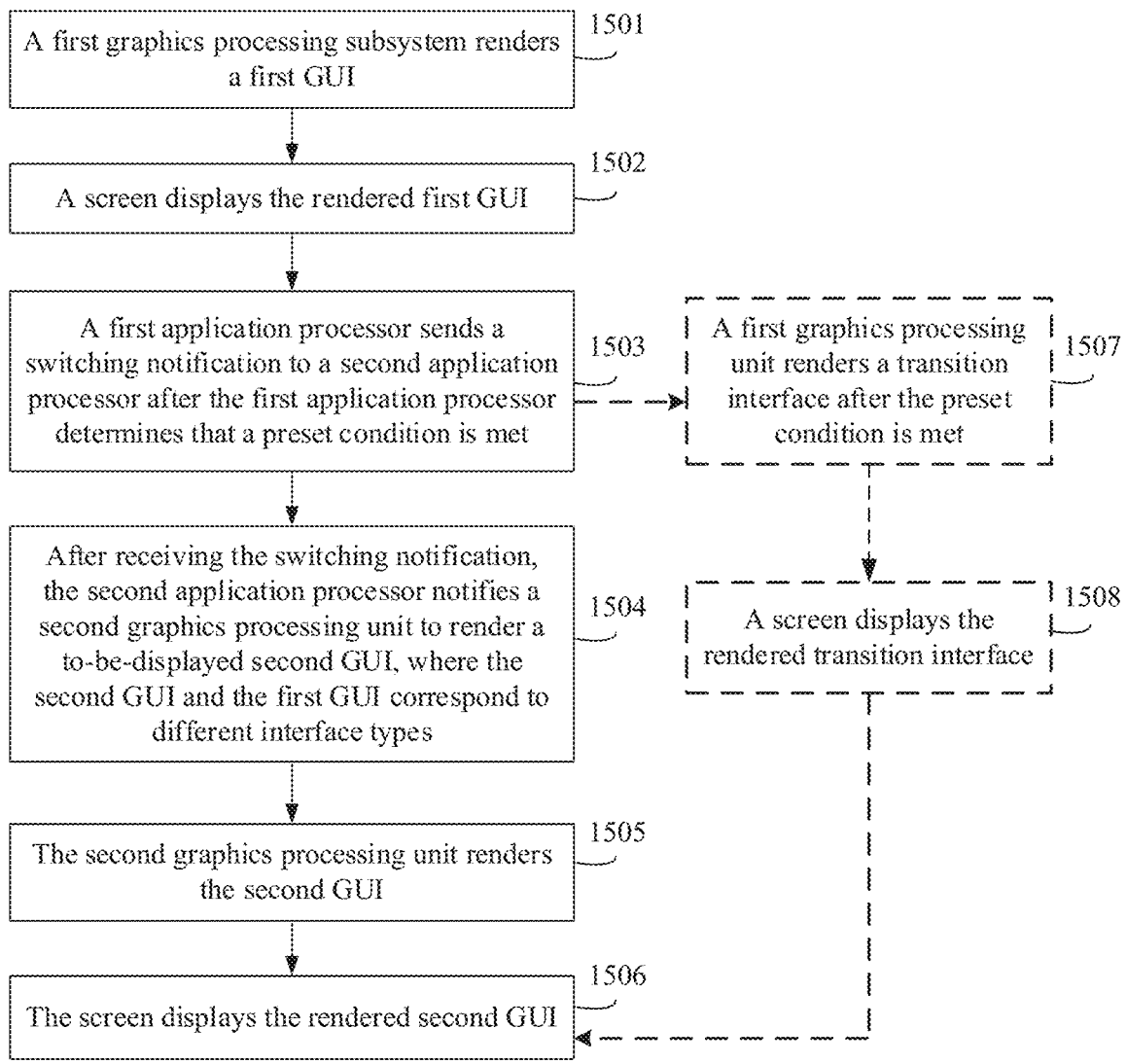
FIG. 15 is a flowchart of a display processing method according to an embodiment of this application.

Refer to FIG. 15. The display processing method may include the following steps.

Step 1501: The first graphics processing subsystem renders a first GUI.

For example, the electronic device may be a wearable device. For example, the electronic device may be the smartwatch in the foregoing embodiments, the first graphics processing subsystem may be the graphics processing subsystem 1 with relatively high performance and power consumption shown in FIG. 3 to FIG. 6, and the first GUI may be a 3D watch face interface.

Step 1502: The screen displays the rendered first GUI.

Figure 8:
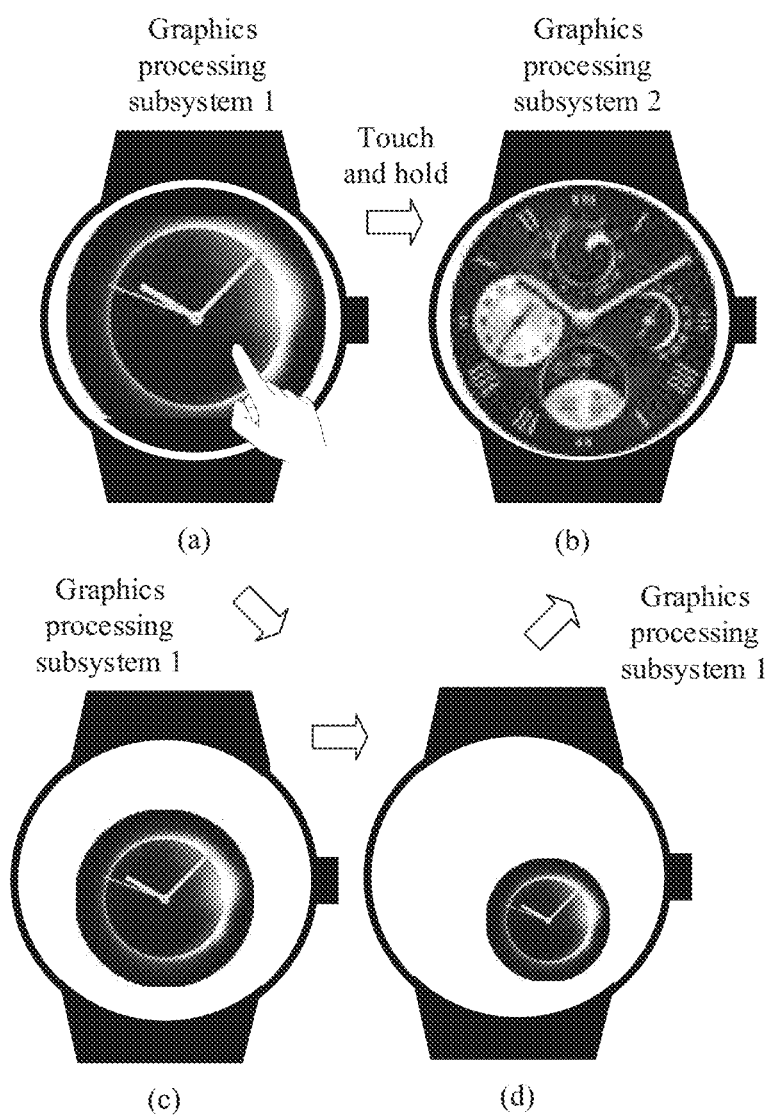
FIG. 8 is a schematic diagram of another group of interfaces of a smartwatch according to an embodiment of this application.
Figure 9A:
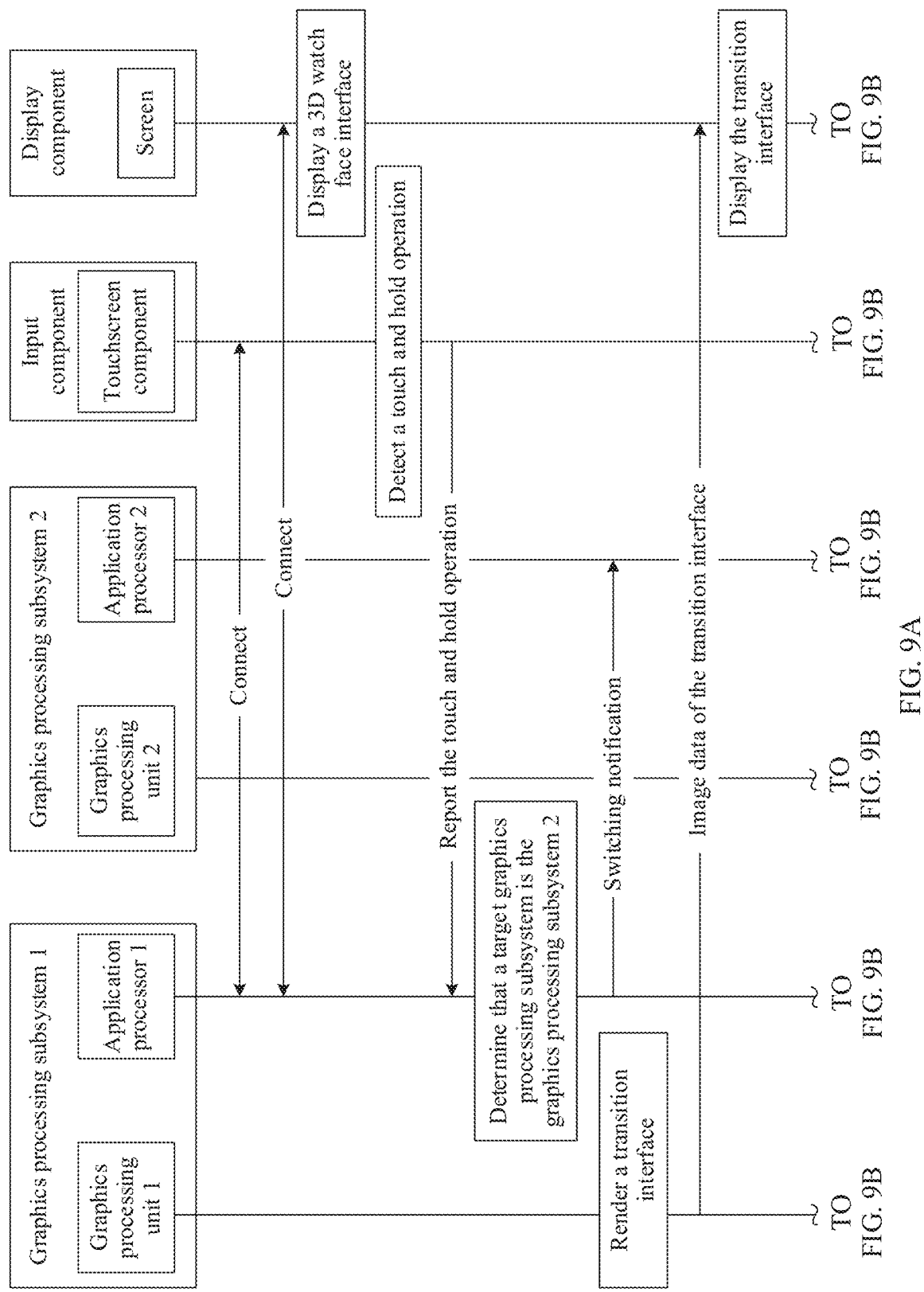
FIG. 9A and FIG. 9B are a flowchart of a display processing method according to an embodiment of this application.
Figure 9B:
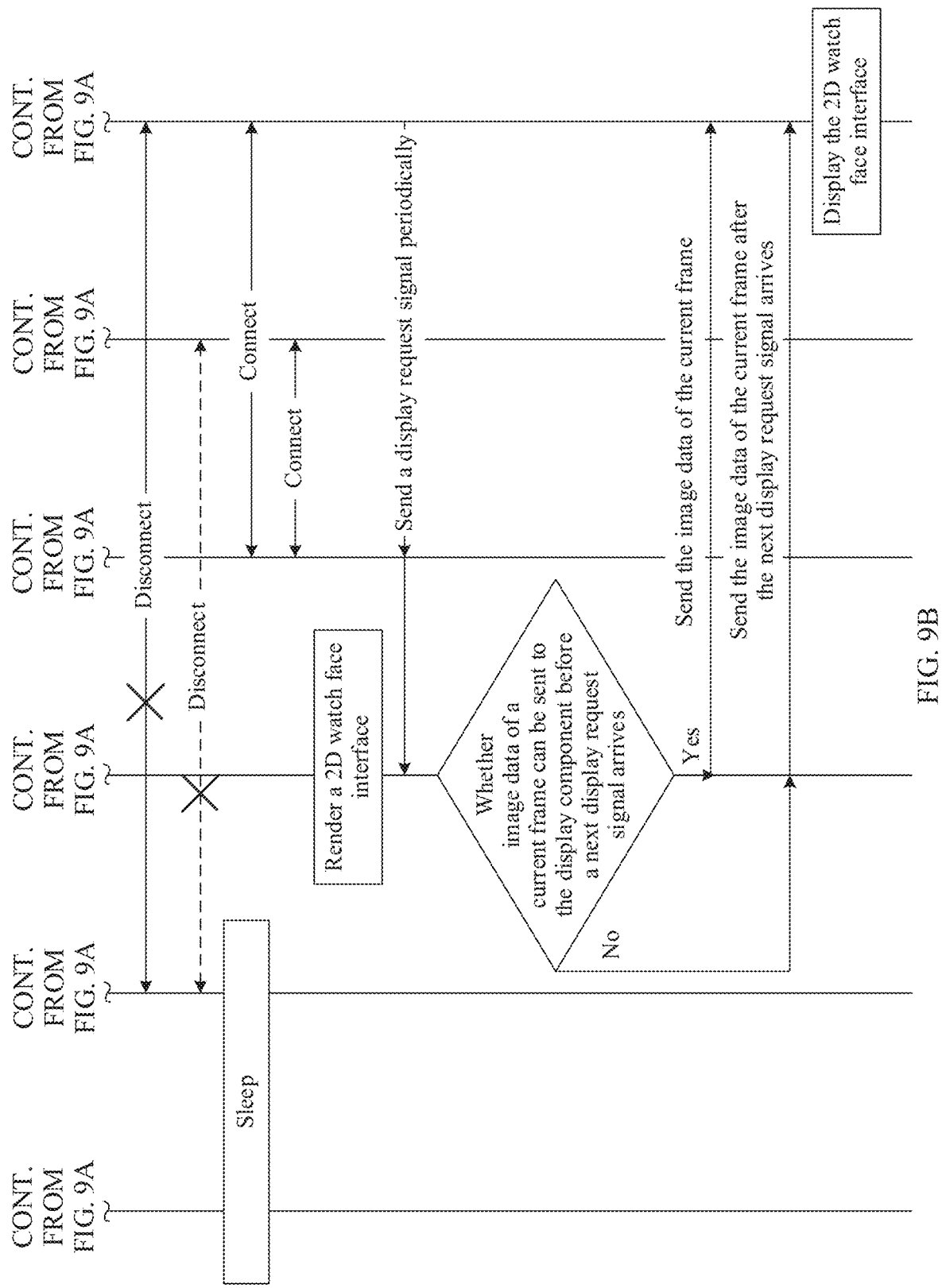

For example, when the first GUI is the 3D watch face interface, for a schematic diagram of the 3D watch face interface displayed on the screen, refer to (a) in FIG. 8.

Step 1503: The first application processor sends a switching notification to the second application processor after the first application processor determines that a preset condition is met.

After determining that the preset condition is met, the first application processor may send the switching notification to the second application processor to indicate to switch to the second graphics processing subsystem for display processing.

For example, the preset condition may be that the electronic device detects a touch and hold operation performed by a user on the 3D watch face interface, and the second graphics processing subsystem may be the graphics processing subsystem 2 with relatively low performance and power consumption shown in FIG. 3 to FIG. 6.

Step 1504: After receiving the switching notification, the second application processor notifies the second graphics processing unit to render a to-be-displayed second GUI, where the second GUI and the first GUI correspond to different interface types.

GUIs of different interface types have different complexity. To be specific, complexity of the second GUI is different from complexity of the first GUI. After leaning of the graphics processing subsystem switching notification, the second application processor may control the second graphics processing unit to render the to-be-displayed second GUI. For example, the first GUI may be the 3D watch face interface, and the to-be-displayed second GUI may be a 2D watch face interface.

Step 1505: The second graphics processing unit renders the second GUI.

Step 1506: The screen displays the rendered second GUI.

For example, for a schematic diagram of the 2D watch face interface displayed on the screen, refer to (b) in FIG. 8.

In this solution, for to-be-displayed GUIs of different interface types, the electronic device can switch to use graphics processing subsystems with different performance and different power consumption for display processing. GUIs of different interface types have different complexity. For example, for a high-complexity GUI, the electronic device may use a graphics processing subsystem with high performance and high power consumption to perform processing; and for a low-complexity GUI, the electronic device may use a graphics processing subsystem with low performance and low power consumption to perform processing, instead of using a unified graphics processing subsystem with high performance and high power consumption to perform processing. In other words, the electronic device may balance display processing performance and power consumption of different to-be-displayed GUIs, to implement optimal energy efficiency for the different to-be-displayed GUIs. Therefore, the plurality of graphics processing subsystems in the electronic device have relatively low average power consumption and relatively high average energy efficiency. In addition, the plurality of graphics processing subsystems have relatively high overall energy efficiency and relatively low overall power consumption. Therefore, energy efficiency of the electronic device for graphics display processing is relatively high, and overall power consumption of the electronic device is relatively low.

In some embodiments, refer to FIG. 15. After the electronic device determines that the preset condition is met, and before the rendered second GUI is displayed, the method further includes the following steps.

Step 1507: The first graphics processing unit renders a transition interface.

Step 1508: The screen displays the rendered transition interface.

In this way, the transition interface may continuously provide interface display for the user in a graphics processing subsystem switching process, to avoid a phenomenon such as interruption, a black screen, or screen flickering on an interface viewed by the user, and improve visual experience of the user. For example, in a scenario in which the first GUI is the 3D watch face interface, and the second GUI is the 2D watch face interface, for the transition interface, refer to (c) and (d) in FIG. 8.

In some embodiments, that the first application processor sends a switching notification to the second application processor after the first application processor determines that a preset condition is met includes: The first application processor sends the switching notification to the second application processor after the first application processor determines that a first input operation is detected and the preset condition is met. The first input operation may include a touchscreen-based input operation, a button-based operation, a voice input operation, or the like. That is, the electronic device determines, only after detecting triggering of an input operation of the user, whether to perform graphics processing subsystem switching.

For example, the electronic device may further include a memory. The memory stores prestored information such as a preset application, an application function, or a preset GUI corresponding to the second graphics processing subsystem. If an application or a function of the to-be-displayed second GUI, or the second GUI corresponds to the prestored information, the electronic device may perform display processing by using the second graphics processing subsystem.

In some technical solutions, the memory stores a preset application corresponding to the second graphics processing subsystem. That the first application processor determines that a preset condition is met includes: The first application processor determines that the second GUI corresponds to a first interface type and the first GUI corresponds to a second interface type. A GUI of the first interface type includes a GUI corresponding to the preset application, and a GUI of the second interface type includes a GUI other than the GUI corresponding to the preset application.

For example, the second graphics processing subsystem may be the graphics processing subsystem 1 in Table 5. The GUI of the first interface type may include a GUI of a preset application corresponding to the graphics processing subsystem 1 in Table 5. For example, the preset application includes a payment application, a camera application, a music application, a call application, a game application, or the like. The GUI of the second interface type may include a GUI other than a GUI of an application corresponding to the graphics processing subsystem 2 in Table 5. For example, the GUI of the second interface type may include a GUI of a preset application corresponding to the graphics processing subsystem 2 in Table 5.

Alternatively, the preset application may be an application shown in Table 6 that has a function associated with remote network communication.

Alternatively, the preset application may be a third-party application shown in Table 7.

In some other technical solutions, the memory stores a preset function corresponding to the second graphics processing subsystem. That the first application processor determines that a preset condition is met includes: The first application processor determines that the second GUI corresponds to a first interface type and the first GUI corresponds to a second interface type. A GUI of the first interface type includes a GUI corresponding to the preset function, and a GUI of the second interface type includes a GUI other than the GUI corresponding to the preset function. For example, the preset function may be associated with remote network communication.

For example, the second graphics processing subsystem may be the graphics processing subsystem 1 in Table 9. The preset function may be a function corresponding to the graphics processing subsystem 1 in Table 9. The GUI of the first interface type may include a GUI of the preset function corresponding to the graphics processing subsystem 1 in Table 9. The GUI of the second interface type may include a GUI other than the GUI of the preset function corresponding to the graphics processing subsystem 1 in Table 9. For example, the GUI of the second interface type may be a GUI of a function corresponding to the graphics processing subsystem 2 in Table 9.

In some other technical solutions, the memory stores a preset GUI corresponding to the second graphics processing subsystem. That the first application processor determines that a preset condition is met includes: The first application processor determines that the second GUI corresponds to a first interface type and the first GUI corresponds to a second interface type. A GUI of the first interface type includes the preset GUI, and a GUI of the second interface type includes a GUI other than the preset GUI. For example, the second graphics processing subsystem may be the graphics processing subsystem 1 in Table 10, and the preset GUI may be a GUI corresponding to the graphics processing subsystem 1 in Table 10.

In some other embodiments, the second GUI and the first GUI are respectively of a 3D interface type and a 2D interface type.

In some other embodiments, the memory stores at least one preset parameter group corresponding to the second graphics processing subsystem, and the preset parameter group includes a preset GUI and a preset input operation. That the first application processor determines that a preset condition is met includes: The first application processor determines that a second input operation is detected. The first GUI and the second input operation match the preset GUI and the preset input operation in the preset parameter group. The second input operation may include a touchscreen-based input operation, a button-based operation, a voice input operation, or the like.

For example, the second graphics processing subsystem may be the graphics processing subsystem 1 in Table 2, and the preset parameter group may be a preset parameter group including a displayed interface and an input operation corresponding to the graphics processing subsystem 1 in the correspondence shown in Table 2.

In some other embodiments, that the first application processor determines that a preset condition is met includes: The first application processor determines that a third input operation is detected. The third input operation is used to indicate to perform graphics processing subsystem switching, or the third input operation is used to indicate to use the second graphics processing subsystem. The third input operation may include a touchscreen-based input operation, a button-based operation, a voice input operation, or the like. For example, the input operation may be the input operation shown in Table 4.

It may be understood that, to implement the foregoing functions, the electronic device includes corresponding hardware and/or a software module for performing each function. With reference to algorithm steps of each example described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in this embodiment, division into modules is an example and is merely logical function division. During actual implementation, there may be another division manner.

An embodiment of this application further provides an electronic device, including one or more processors and one or more memories. The one or more memories are coupled to the one or more processors, the one or more memories are configured to store computer program code, and the computer program code includes computer instructions. When the one or more processors execute the computer instructions, the electronic device is enabled to perform the steps performed by the electronic device in the method embodiments, to implement the display processing method.

An embodiment of this application further provides a computer-readable storage medium. The computer-readable storage medium stores computer instructions. When the computer instructions are run on an electronic device, the electronic device is enabled to perform the related method steps, to implement the display processing method in the foregoing embodiments.

An embodiment of this application further provides a computer program product. When the computer program product is run on a computer, the computer is enabled to perform the related steps, to implement the display processing method performed by the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the display processing method performed by the electronic device in the foregoing method embodiments.

The electronic device, the computer-readable storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed to different places. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip or the like) or a processor (processor) to perform all or some of the steps of the methods described in embodiments of this application. The foregoing storage medium includes: any medium that can store program code, for example, a USB flash drive, a removable hard disk, a read-only memory (read-only memory, ROM), a RAM, a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A display processing method implemented by an electronic device, wherein the electronic device comprises a first graphics processing subsystem, a second graphics processing subsystem and a screen, wherein the first graphics processing subsystem comprises a first graphics processor, a first application processor, and a first memory, and wherein the second graphics processing subsystem comprises a second graphics processor, a second application processor, and a second memory, the display processing method comprising:

instructing, by the first application processor, the first graphics processor to render a first graphical user interface (GUI);
rendering, by the first graphics processor, the first GUI;
determining, by the first application processor, that a first preset condition is met;
sending, by the first application processor after determining that the first preset condition is met, a first switching instruction to the second application processor, wherein the first graphics processing subsystem enters a sleep state after sending the first switching instruction;
receiving, by the second application processor, the first switching instruction;
instructing, by the second application processor after receiving the first switching instruction, the second graphics processor, to render a second graphical user interface (GUI);
rendering, by the second graphics processor, the second GUI;
displaying, by the screen, the second GUI;
determining, by the second application processor, that a second preset condition is met;
waking up, by the second application processor after determining that the second preset condition is met, the first graphics processing subsystem, and
rendering, by the first graphics processor of the first graphical processing subsystem, the first GUI,
wherein the second GUI and the first GUI correspond to different interface types,
wherein determining, by the first application processor, that the first preset condition is met comprises, in response to a first operation, determining that the first operation corresponds to the second GUI, wherein the second GUI corresponds to the second graphics processing subsystem, and
wherein determining, by the second application processor, that the second preset condition is met comprises, in response to a second operation, determining that the second operation corresponds to the first GUI, and wherein the first GUI corresponds to the first graphics processing subsystem.

2. The display processing method of claim 1, wherein the first application subsystem is a high-performance graphics processing subsystem, and wherein the second application subsystem is a low-performance graphics processing subsystem.

3. The display processing method of claim 2, wherein determining, by the first application processor, that the first preset condition is met comprises determining, that the second GUI is a two-dimensional (2D) interface type; and wherein determining, by the second application processor, that the second preset condition is met comprises determining that the first GUI is a three-dimensional (3D) interface type.

4. The display processing method of claim 2, wherein determining, by the second application processor, that the second preset condition is met comprises determining that the first GUI corresponds to a first preset application, and wherein the second GUI does not correspond to the first preset application.

5. The display processing method of claim 4, wherein the first preset application comprises a payment application, a camera application, a music application, a call application, a third-party application or a game application, and wherein the first preset application has a function associated with remote network communication.

6. An electronic device, comprising:
a first graphics processing subsystem comprising a first graphics processor, a first application processor, and a first memory;
a second graphics processing subsystem comprising a second graphics processor, a second application processor, and a second memory; and
a screen coupled to the first graphics processing subsystem, wherein the first graphics processing subsystem is configured to:
instruct, by the first application processor, the first graphics processor to render a first graphical user interface (GUI);
render, by the first graphics processor, the first GUI;
determine, by the first application processor, that a first preset condition is met;
send, by the first application processor, after determining that the first preset condition is met, a first switching instruction to the second application processor, wherein the first graphics processing subsystem is configured to enter a sleep state after sending the first switching instruction,
wherein the second graphics processing subsystem is configured to:
receive, by the second application processor, the first switching instruction;
instruct, by the second application processor, after receiving the first switching instruction, a second graphics processor to render a second GUI;
render, by the second graphics processor, the second GUI;
determine, by the second application processor, that a second preset condition is met;
send, by the second application processor, after determining that the second preset condition is met, a second switching instruction to a first application processor configured to wake up the first graphics processing subsystem; and
render, by the first graphics processor of the first graphical processing subsystem, the first GUI,
wherein the second GUI and the first GUI correspond to different interface types,
wherein determine, by the first application processor, that the first preset condition is met comprises, in response to a first operation, determine that the first operation corresponds to the second GUI, wherein the second GUI corresponds to the second graphics processing subsystem, and
wherein determine, by the second application processor, that the second preset condition is met comprises, in response to a second operation, determine that the second operation corresponds to the first GUI, and wherein the first GUI corresponds to the first graphics processing subsystem.

7. The electronic device of claim 6, wherein the first application subsystem is a high-performance graphics processing subsystem, and wherein the second application subsystem is a low-performance graphics processing subsystem.

8. The electronic device of claim 7, wherein determine, by the first application processor, that the first preset condition is met comprises determine, that the second GUI is a two-dimensional (2D) interface type, and wherein determine, by the second application processor, that the second preset condition is met comprises determine that the first GUI is a three-dimensional (3D) interface type.

9. The electronic device of claim 6, wherein determine, by the second application processor, that the second preset condition is met comprises determine that the first GUI corresponds to a first preset application, and wherein the second GUI does not correspond to the first preset application.

10. The electronic device of claim 9, wherein the first preset application comprises a payment application, a camera application, a music application, a call application, a third-party application or a game application, and wherein the first preset application has a function associated with remote network communication.

11. A computer program product comprising instructions stored on a non-transitory computer-readable medium and that, when executed by one or more processors, cause an electronic device comprising a first graphics processing subsystem, a second graphics processing subsystem and a screen to:
instruct, by a first application processor, a first graphics processor of the first graphics processing subsystem to render a first graphical user interface (GUI);
render, by the first graphics processor, the first GUI;
determine, by the first application processor of the first graphics processing subsystem, that a first preset condition is met;
send, by the first application processor after determining that the first preset condition is met, a first switching instruction to a second application processor of the second graphics processing subsystem, wherein the first graphics processing subsystem enters a sleep state after sending the first switching instruction;
receive, by the second application processor of the second graphics processing subsystem, the first switching instruction;
instruct, by the second application processor after receiving the first switching instruction, a second graphics processor of the second graphics processing subsystem, to render a second graphical user interface (GUI);
render, by the second graphics processor, the second GUI;
display, by the screen, the second GUI;
determine, by the second application processor, that a second preset condition is met;
wake up, by the second application processor after determining that the second preset condition is met, the first graphics processing subsystem; and
render, by the first graphics processor of the first graphical processing subsystem, the first GUI,
wherein the first graphics processing subsystem comprises the first graphics processor, the first application processor and a first memory, and wherein the second graphics processing subsystem comprises the second graphics processor, the second application processor and a second memory,
wherein the second GUI and the first GUI correspond to different interface types,
wherein determine, by the first application processor, that the first preset condition is met comprises, in response to a first operation, determine that the first operation corresponds to the second GUI, wherein the second GUI corresponds to the second graphics processing subsystem, and
wherein determine, by the second application processor, that the second preset condition is met comprises, in response to a second operation, determine that the second operation corresponds to the first GUI, and wherein the first GUI corresponds to the first graphics processing subsystem.

12. The computer program product of claim 11, wherein the first application subsystem is a high-performance graphics processing subsystem, and wherein the second application subsystem is a low-performance graphics processing subsystem.

13. The computer program product of claim 12, wherein determine, by the first application processor, that the first preset condition is met comprises determine, that the second GUI is a two-dimensional (2D) interface type; and wherein determine, by the second application processor, that the second preset condition is met comprises determine that the first GUI is a three-dimensional (3D) interface type.

14. The computer program product of claim 12, wherein determine, by the second application processor, that the second preset condition is met comprises determine that the first GUI corresponds to a first preset application, and wherein the second GUI does not correspond to the first preset application.

15. The computer program product of claim 14, wherein the first preset application comprises a payment application, a camera application, a music application, a call application, a third-party application or a game application, and wherein the first preset application has a function associated with remote network communication.

\* \* \* \* \*